June 2, 1970 D. M. ARKIN ET AL 3,516,063

SUPERVISORY AND CONTROL SYSTEM HAVING BUFFER STORAGE INPUT TO DATA LOGGER

Filed May 9, 1966 25 Sheets-Sheet 1

INVENTORS
DAVID M. ARKIN
BRUNO A. MATTEDI
RICHARD P. SANDERS
JOSEPH F. SULLIVAN

BY Spencer E. Olson
ATTY.

June 2, 1970 D. M. ARKIN ET AL 3,516,063

SUPERVISORY AND CONTROL SYSTEM HAVING BUFFER STORAGE INPUT TO DATA LOGGER

Filed May 9, 1966 25 Sheets-Sheet 2

June 2, 1970 D. M. ARKIN ET AL 3,516,063

SUPERVISORY AND CONTROL SYSTEM HAVING BUFFER STORAGE INPUT TO DATA LOGGER

Filed May 9, 1966 25 Sheets-Sheet 6

June 2, 1970 D. M. ARKIN ET AL 3,516,063

SUPERVISORY AND CONTROL SYSTEM HAVING BUFFER STORAGE INPUT TO DATA LOGGER

Filed May 9, 1966 25 Sheets-Sheet 14

June 2, 1970 D. M. ARKIN ET AL 3,516,063

SUPERVISORY AND CONTROL SYSTEM HAVING BUFFER STORAGE INPUT TO DATA LOGGER

Filed May 9, 1966 25 Sheets-Sheet 21

United States Patent Office 3,516,063

Patented June 2, 1970

3,516,063

SUPERVISORY AND CONTROL SYSTEM HAVING BUFFER STORAGE INPUT TO DATA LOGGER

David M. Arkin, Chicago, Bruno A. Mattedi, Addison, Richard P. Sanders, Lisle, and Joseph F. Sullivan, Lombard, Ill., assignors, by mesne assignments, to Leeds & Northrup Company, Philadelphia, Pa., a corporation of Pennsylvania Filed May 9, 1966, Ser. No. 548,745

Int. Cl. H04q *9/14*

U.S. Cl. 340—163 6 Claims

ABSTRACT OF THE DISCLOSURE

A supervisory control system, having master and remote stations with automatic scanning and reporting of the status of devices located at the remote stations, to the master station. Selection and control of the equipment located at remote stations by the master station interrupts the automatic scan. After transmission of control messages the automatic scan is resumed. Single addresses may be associated with either one or a plurality of remotely located status devices. Selective interrogation of individual status devices may be accomplished in a manner similar to that for exercising control of remotely located devices. Facilities for checking the accuracy of the selection of a point to be controlled, before operating are further included.

This invention relates to a control system for use in fields such as electric power control, gas or petroleum pipe line control and similar environments.

More particularly it pertains to a system providing means for selecting and operating control equipment at a distant point and reporting back to the initiating point an indication of the status of such control equipment. In addition it further includes facilities for automatic scanning and reporting of the status of devices located remote to the common point. Further included in the present system are facilities for the conversion of analog information at remote locations into digital form and transmission of the digital information to the master station in the same manner as alarm or other simple status reports.

Accordingly it is the object of this invention to provide a system for controlling equipment at a number of remote stations from a master station, and telemetering information between said stations in electric power distribution, pipe line or similar systems.

A first feature of the instant system is the provision of high speed operation based upon using electronic circuitry.

A second feature shall be the use of digital transmission techniques for the telemetering of information, with a resultant high degree of accuracy.

A third feature shall be the utilization of an efficient message block structure for transmission purposes that permits the usage of cyclic codes for error detection and effective utilization of transmission time.

Another feature is the inclusion of means for scanning a number of remote points in response to the generation of a single address at a master station.

Yet another feature is the inclusion of circuitry whereby a constant scan of information points may be interrupted to access and operate a control point in a remote office and automatically resume the scan after said operation has been effected.

A final feature is the inclusion of circuitry whereby a constant scan of information points may be interrupted to interrogate a single information point in a remote office and automatically resume the scan after said operation has been effected.

The above mentioned and other objects and features of this invention and the manner of attaining them will become more apparent and the invention itself will be better understood by reference to the following description of an embodiment of the invention taken in connection with the accompanying drawings comprising FIGS. 1–29 wherein:

FIGS. 1–3 are diagrams of the message structures utilized in the instant system;

FIGS. 4–10 comprise a diagram showing the equipment located in a remote station for use in the above-mentioned system;

FIG. 11 comprises a diagram indicating several different forms of utilization of the end element control relays located in a remote station in accordance with the present invention;

FIGS. 12–27 comprise a diagram showing the equipment located in a master station for use in the above-mentioned system;

FIG. 28 shows the manner in which

FIG. 29 shows the manner in which

Figure 1:
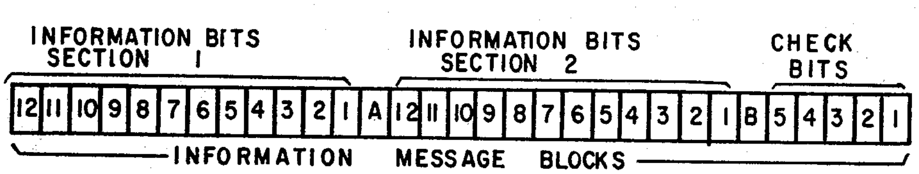
Figure 2:
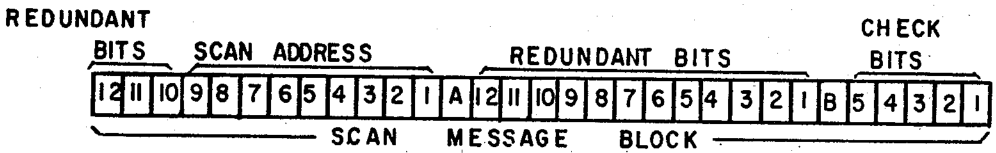
Figure 3:
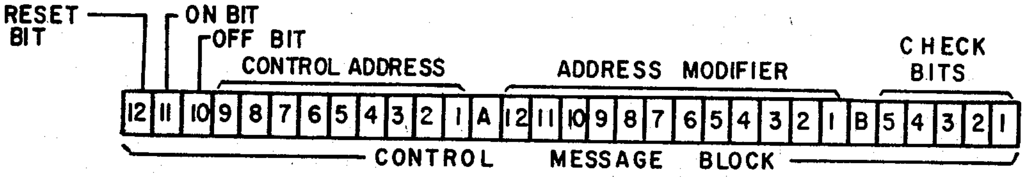
Figure 28:
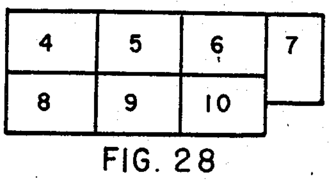
Figure 29:
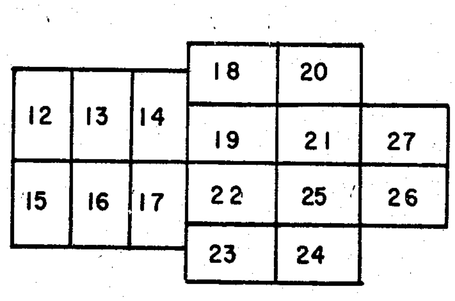
Figure 4:
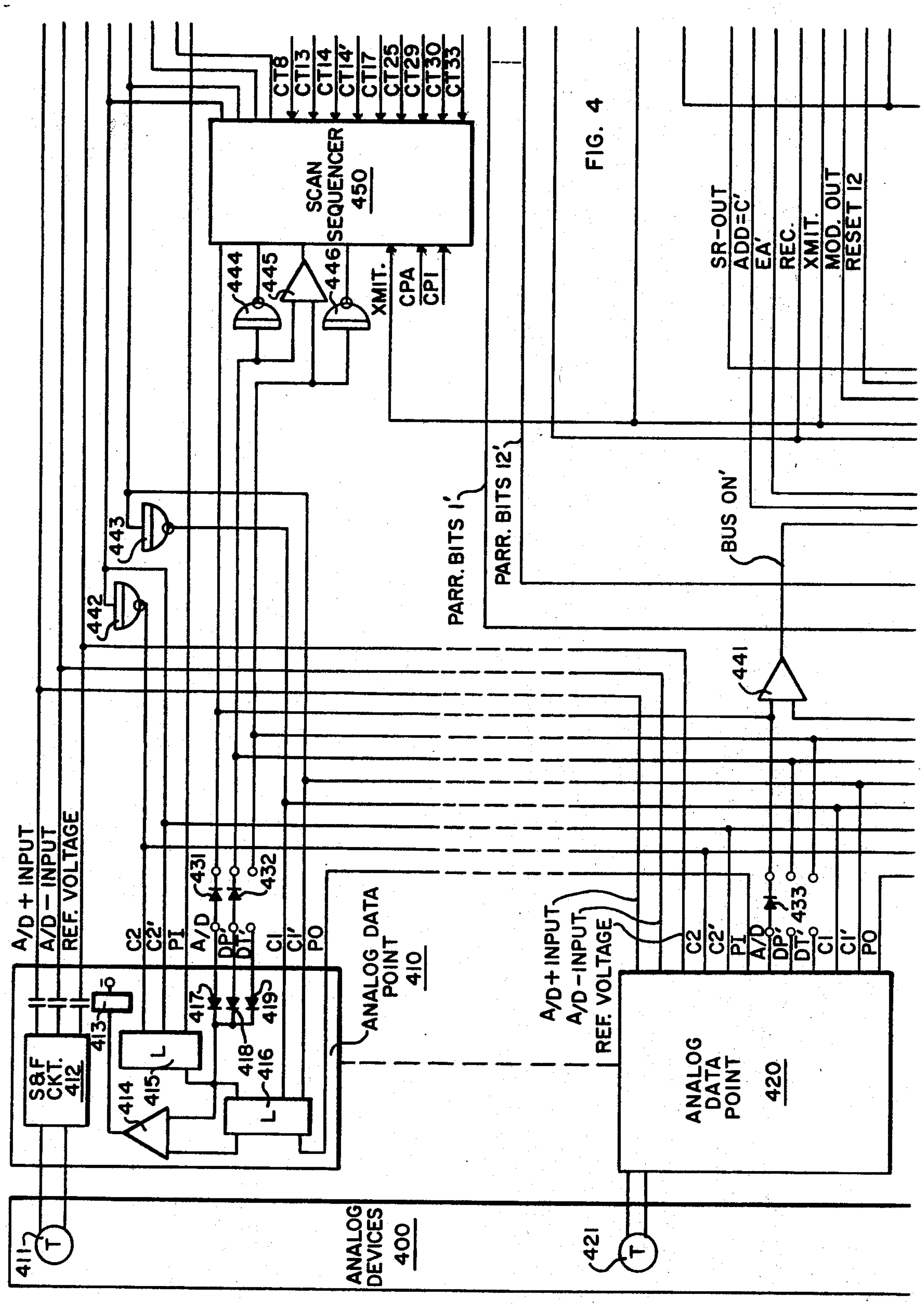
FIGS. 4–10 are to be arranged.
Figure 5:
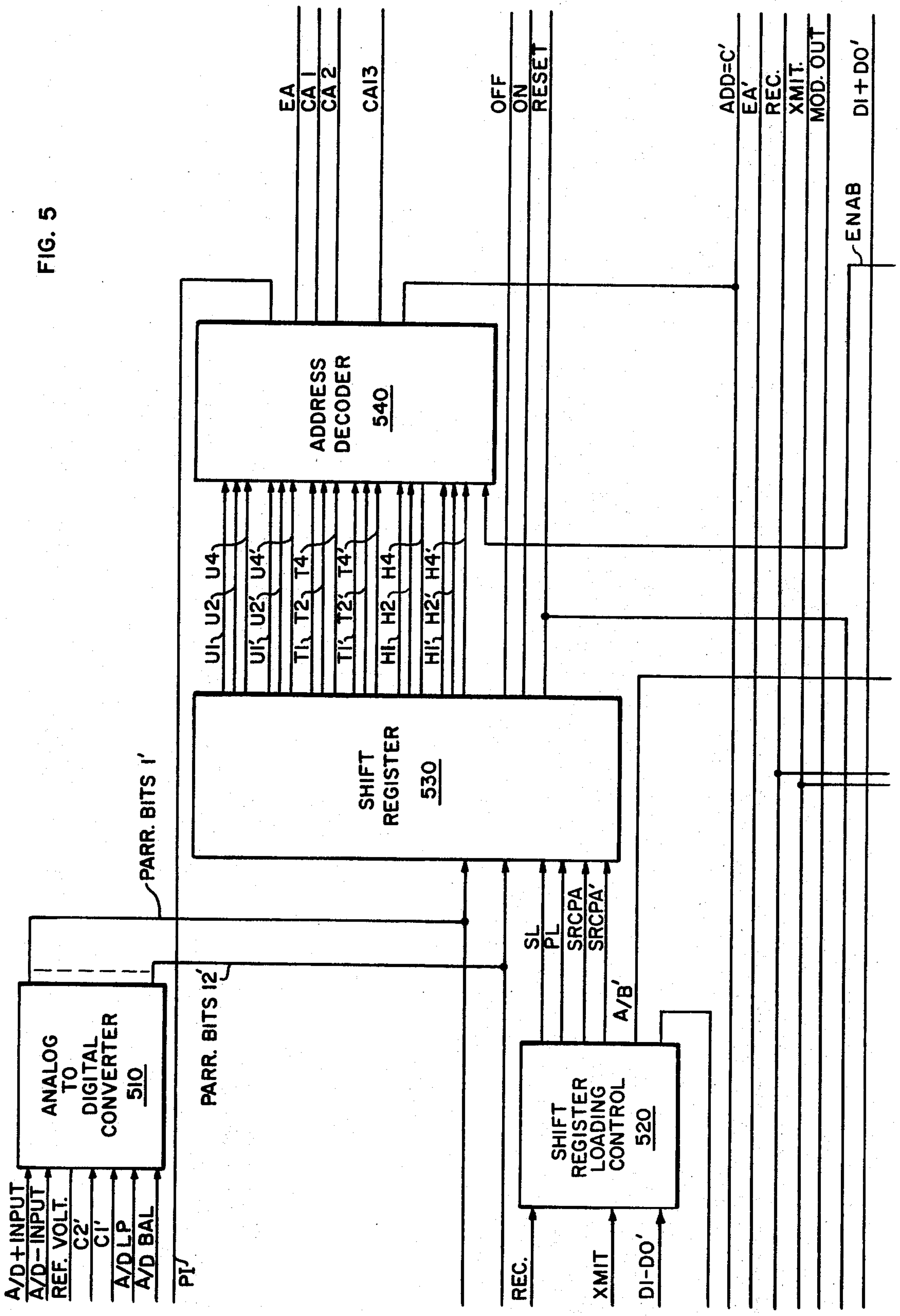

FIGS. 28 and 29 appear on the same sheet of drawings as FIGS. 1–3.

The system as disclosed herein is a wired program supervisory control system designed to meet diversified industrial requirements. The system provides efficient high speed control of industrial equipment. Information received from remote locations is displayed at a centralized master station for easy interpretation by an operator facilitating control of the entire system.

The functions of the system may be categorized as being supervision and control of remote locations connected to a centralized point by communication facilities. In the supervisory mode the system continually scans remote stations interrogating all indication points for status or alarm conditions. All data points are displayed continuously. Visual indications such as digital readouts and alarm lights are stored and updated at the master station. The alarm condition detected by the system is immediately brought to the operator's attention by the flashing of an associated visual display lamp and the sounding of an audible alarm.

The continuous automatic scan may be interrupted by the operator to permit control of equipment. The operator may select a point to be controlled by operating an associated push button with an associated lamp to indicate that the point has been selected. When the operator subsequently operates a common control function push button, the automatic scan will be interrupted and the control sequence initiated. Verification of the control function and its completion is provided at the master station, after which the system scan automatically resumes from the point at which it was interrupted.

In a manner similar to that for control, instrument readings or device status indications, may be obtained and displayed at the master station upon demand. The operator selecting the point to be interrogated by operating the associated push button. The data associated with the point is then updated on the appropriate display.

The system as disclosed herein finds use in the electric power field, gas or petroleum pipe line industries and similar environments.

Binary indications such as on-off, open, closed, etc. determined by simple contact closures or by combination of contact closures are converted by a remote station into a message in usable form for transmission to a master station where the indications are displayed. System parameters such as pressure, temperature, slow rate, power, voltage, etc. are sensed by transducers which develop an electric analog with a measured quantity. This analog is then converted into an encoded digital value and transmitted to the master station for display.

Continuous scanning of all points at the remote stations insures the availability of up to date data at the master station. All information received through continuous scanning is displayed by means of lamps and/or digital display units. All alarms and equipment status changes initiated at the remote stations cause an automatic visual and/or audible alarm at the master station.

The present system employs a high information transfer rate made possible by the use of digital techniques. Transmission errors are detected through a highly efficient error detection scheme to guard against processing data made invalid by the communication facility. Further securities afforded by utilizing answer back address and check before operate control techniques.

Any type of transmission facility may be used for communications such as open wire, D.C. loop, carrier or microwave. The capability to operate at low and high transmission rates is inherent in the system and terminal equipment compatible with any commercial available communication facility can be provided. The system is organized to readily accommodate both double precision and double transmission techniques. Both techniques are applicable to digitized to analog signals as well as to binary data. The most important to an understanding of the present system is an understanding of the message structure employed therein. The following description taken in connection with FIGS. 1–3 will describe this message structure.

The basic data communications unit is a message "block" of thirty-one binary digits (bits). The basic format of the information block is shown in FIG. 1. All transmissions are comprised of one or more up to a maximum of eight message blocks transmitted serially.

The basic message block is composed of two thirteen bit information sections and one five bit section for error detection. The first thirteen bits constitute the first information section which can contain twelve bits of useful data; the thirteenth bit is used for internal purposes. The second thirteen bits constitute the second information section which can also contain twelve bits of useful data, the twenty-sixth bit being used for internal purposes. Referring to FIG. 1 the thirteenth and twenty-sixth bits have been arbitrary designated as bits A and B respectively for easy reference. The remaining five check bits provide a means of code checking to insure detection of any transmission errors occurring after encoding and before decoding caused by the transmission system.

If the information section contains binary status indications, each bit within the section may constitute an indication (excluding the A or B bit), thus providing up to twelve indications per section or twenty-four indications per message block. There are no restrictions as to the format of the twelve bits of the information section. When digitized information is being transferred from one station to another the information section may contain a three digit (nine bit) octal coded address or a three digit analog value, encoded in either BCD or binary form as required.

The master station serially transmits a nine bit three digit address, contained within the first section of the one block scan message, to interrogate a remote station. The remaining three bits of the first section and the twelve bits of the second section of this scan are not used however to satisfy message security format redundant bits are transmitted. The makeup of the scan message is shown in FIG. 2. Addressing is performed on a per reply basis, and each scan address has the power to cause the remote station to initiate an eight block reply. The remote station equipped to decode the transmitted address will reply by returning the scan address that initiated the reply transmission, followed by subsequent data sections containing field data.

The answer back technique of returning the scan address in the first section of the reply message assures the master station that the address was not distorted during transmission; a bit by bit comparison of the transmitted address with the received address is made at the master station. If the security check is not satisfied the entire scan reply message is rejected and the remote station is re-interrogated.

The second information section of the first message block of the scan reply message and all subsequent message blocks contain field data. As many as fifteen data sections may be included in the variable length reply message based on the amount of field data to be returned. Each data section may contain as many as twelve status indications or a digitized analog signal. A total of one hundred eighty status indications or fifteen digitized analog signals or a combination thereof may be included in the scan reply message.

As data is received at the master station in response to the master station interrogation, security checks will be performed in each data section to detect any error which might have been caused by the transmission facility. Any message block failing to pass the security check is rejected and its associated display is not updated. Message blocks containing valid data are stored, and the associated displays are updated.

Rejection of an individual message block (or blocks) in no way invalidates the message blocks preceding or following the blocks in error. In order that valid data be obtained from all points a second and if necessary a third interrogation can be made. In these subsequent trys the master station uses all data blocks passing security checks.

Control functions are accomplished by momentarily interrupting the normal scan sequence and initiating a control sequence. Control messages, as shown in FIG. 3, are shaped into the same message format as the scan messages, except that the three remaining bits in the first or address section and the twelve bits in the second section of the message block are now used to advantage. Two of the three remaining "unused" bits in the control address section will now be used to select the operation to be performed such as on, off or some similar binary function. With this arrangement a common "on" bus and a common "off" bus are established for all control addresses in a remote station. Each control address can control twelve discrete on-off momentary closure devices. The remaining bit of the control address section is used to select the reset function. Thus bit 10 (on), bit 11 (off), and bit 12 (reset) of the address section are now used to advantage.

The second section of the control message block is used to expand upon or modify the basic control address, see FIG. 3. In the case of the binary or two state control such as on-off, the twelve useful bits of the modifier are used to indicate which device is to be energized; up to twelve control functions may be derived thus from each control address.

The control message appended by the five check bits is transmitted to the remote station. That remote station equipped to decode the transmitted address replies by returning the control message to the master station for verification constituting a check before operate technique. If this check is satisfactory and if the normal error checking routine is satisfied, a one block activate message is transmitted to the remote. This causes the remote station to initiate the desired function and as this action begins the activated message is returned to the master station as an acknowledgment. It should be noted that the format of the activate message is the same as that of the scan message.

If the first attempt to initiate a control function is unsuccessful, a second attempt is initiated and if necessary a third attempt. An error signal is generated if the control routine cannot be completed. The automatic scan is resumed at the end of the control cycle under all circumstances.

The above descriptions of message configurations have described the makeup of the message without respect to transmission requirements such as synchronization, line settling, etc. Each message block is preceded by a start bit and that each message configuration is terminated with an end of message bit. Actually each message block is preceded by a start bit and succeeded by a stop bit, except in the case of a multiple block message such as a scan reply, the stop bit for a message block is also the start bit for the next succeeding block and the last bit at the end of the message conveys the stop information.

Address transmissions from master to remote stations consist of thirty-three bits. One start bit, twenty-six data bits, five check bits and one stop bit. The first block of each transmission from remote to master station also consists of thirty-three bits sub-divided the same as for the master to remote station transmission. However, each succeeding message block excluding the last block in the message will consist of thirty-two bits inasmuch as the stop bit for one message block is actually the start bit for the succeeding block. The last block in the message consists of the total thirty-three bits.

The line to the master station is normally not marked. Line settling time is allowed prior to initiating the remote to master station transmission to allow for line settling subsequent to data set turnon and prior to data transmission, insuring transients or other line faults induced by line switching will not distort the data signal.

ERROR DETECTION

To provide error detection information is encoded during transmission by adding additional information to the message block to enable the receiving station to determine if a transmission error has occurred. Error will be defined as state ZERO being changed to a state ONE or a state ONE to a state ZERO, after encoding and before decoding of a message. The error detection scheme used in this system is based on the use of a Bose-Chaudhuri cyclic code. This error detection scheme will detect all single bit errors, all double errors and all error bursts of length five or less in an extremely high percentage of error bursts of length six or greater. For these calculations the length of an error burst is defined as the number of bits between and including the first and last error in a message block.

The error detection used is constructed such that parity checks are made on selected bit positions. The results of these parity checks have been placed in the message block as check bits. The positions checked and the placement of the check bits is such that when parity checks are made again at the receiving station, the position of an error bit is indicated.

The message block consisting of a fixed number of information bits (twenty-six) and check bits can be described as an end, $k$ code when $n$ equals the total number of bits in the message block 31 and $k$ equals the total number of information bits. Then $n-k$ equals the number of check bits to be appended to the message block.

A binary coded octal scheme of encoding is used for addressing. Three bits weighted 4, 2 and 1 respectively comprise one octal digit. Since the octal digits are the numbers from 0 through 7 any of these digits may be represented as a sum of 4, 2 and 1. Use of this coding scheme in the instant system makes it possible to make 512 addresses available on each line. The present system permits the usage of either binary or binary coded decimal coding techniques for encoding data. Binary coding techniques are commonly used when the system is working with a computer. When decimal displays, output writers, etc. are used BCD coding is convenient.

The A and B bits in the message block differentiate between address and data blocks. Any message having a ONE as its "A" bit contains data; the "B" bit for the same block will be a ZERO; any address block will contain a ZERO in both the A and B bit positions, refer to the table below.

ASSIGNMENT OF ADDRESSING BITS A AND B

| Transmission | First block A | First block B | Subsequent blocks |
|---|---|---|---|
| From master station | 0 | 0 | ---------- |
| From remote station | 0 | 0 | 1 0 |

SYSTEM OPERATION

In the normal supervisory mode two basic classes of information are handled by the present system. The first of these is supervision of the status of contacts indicative of the binary status of a device such as on and off and the telemetering of the actual value of important system parameters such as voltage, power, etc. When the reply to a normal scan is received at the master station, received data is stored temporarily to insure its satisfactory disposal. Digitized instrument readings may be displayed by nixie tubes, loggers, etc. Data and alarm indications may be displayed by indicating lamps and/or audible alarms.

Point supervision is performed by monitoring either normally open or normally closed contacts. Supervisory points are usually equipped so that for a control point open contacts indicate an open, off, etc. condition and closed contacts indicate closed, on, etc. conditions. Similarly for alarm points open contacts indicate a normal condition no alarm then closed contacts an abnormal or alarm condition.

In no way limited to but for purposes of description colored lamps are utilized for indicating purposes in the present system. A red lamp lit steadily would indicate an alarm condition. For the same point a green lamp lit steadily would indicate a normal condition. Unauthorized changes are indicated by flashing of the colored lamp associated with the device that has changed state. Lamp control equipment at the master station will cause the appropriate colored lamps to follow the current state of the remote device. Lamp indications allow the operator to visually observe the operating characteristics of devices at the remote station and make the necessary changes by initiating a control function as required.

For purpose of explanation the present system consists of a master station as shown in FIGS. 12 to 26 arranged as shown in FIG. 29, implemented to supervise and control the gathering and display of field data. Remote stations like that shown in FIGS. 4 to 10 arranged as shown in FIG. 28, reply in response to normal scan interrogations with a scan reply message containing binary and digitized analog data over a communication link which provides for communication between the master and remote stations. In the present disclosure a four wire voice channel is assumed to be the communication facility between master and main line remote stations using half duplex operating techniques. Power supplies providing the necessary operating voltages are included at both master and remote stations.

The following description of the automatic scan mode of operation is based on the assumption of error free transmissions and no equipment malfunction at either remote or master station.

When power is applied to the master station the normal continuous automatic scan mode is initiated and the master station control circuitry offers service to the highest priority functional circuit requesting it. Requests for service from the functional circuits such as scan address circuit, control address circuit, etc. are considered in accordance with established priorities. Assume that service is offered to the scan address circuit. The scan address circuit withdraws information from the first address encoding circuit in the scan sequence and prevents the information in parallel via common instruction bus to the master station control. The master station control circuitry will accept the encoded information pertaining to the subsequent transmission and expect a reply. This information is comprised of the address of the remote station to be interrogated, the number of message blocks to be received, and when pertinent an indication as to which message block in the reply message are to contain double transmission data. For the example being presented single precision and single transmission techniques are assumed.

The master station control serially shifts the three digit scan address with redundant bits to fill the last three bits of the first section and all of the second section of the message block and the appended check bits to the data set. Binary information appearing at the input to the data set is converted to signals compatible with the four wire voice frequency communication facility. In this instance frequency shift keying is used to convert the information to a suitable frequency modulated voice band tone. Transmission synchronizing bits start and stop are appended in the appropriate position in the message configuration and the message is transmitted over the line. Since addressing is performed on a per-reply basis, the address has the power to cause the remote station to initiate up to an eight block reply. Having transmitted the scan message, the master station waits for return transmission from the address to the remote station.

The transmitted message is detected by each remote station data set on the line and serially shifted into the remote station control circuit where it is temporarily stored. Code checks are performed and an address decode is attempted. However, only the address to the remote station will be able to decode the address. At the remote station, the data set receives the incoming message it follows incoming data, makes the determination as to whether each signal received is a binary one (mark) or a binary zero (space) and regenerates the binary information. The regenerated information is serially shifted into the remote station control. A security check is made to determine if an error in transmission has occurred, the scan address is temporarily stored and an address decode is attempted. A successful decoding indicates the message is intended for this remote rather than some other station on the line and therefore a reply message will be initiated.

After the successful decode the remote station control circuitry will apply a mark signal to the line and after a line settling period initiate the scan reply message to the master station. While this action is taking place the first data is being developed by the binary input circuitry and/or the analog to digital converter. The first section of the scan reply message contains the scan address that initiated the reply transmission. Subsequent sections of the scan reply message will contain the appropriate field data developed. During the transmission the remote station control regulates the information flow from the input circuitry to the data set framing the data into the appropriate format and appending message security bits to each message block in the reply. The information will then be shifted serially to the data set for transmission to the master station via the communication facility.

The scan reply message from the remote station is received by the master station data set in the same manner as previously described. It serially shifts the binary information of presenting the received message into the master station control. The master station control circuitry will perform a security check as each section of the data is received and in addition perform a bit by bit comparison of the transmitted scan address with the received scan address. Any message block which contains invalid data due to transmission error is rejected and a further interrogation of the remote station will be made.

The master station control will check to be sure that a reply is received and that the reply contains the number of blocks it should and that no block is in error. If reinterrogation is necessary those reinterrogations are counted by the master station. After a third unsuccessful interrogation, an alarm indication will be provided for the operator and the scan matrix will be incremented to advance to the next address in the scan sequence.

The master station control acts to buffer the received data for a short period of time to insure satisfactory receipt, before sinking the data for display or storage. A display panel or console contains the necessary indicators and lamps, nixie tubes, etc. associated with the received data to be updated each time the remote station is interrogated.

At the conclusion of each routine the master station will offer service to the highest priority functional circuit requesting it. It then accepts the information pertaining to the subsequent transmission and reception. In the normal supervisory mode each remote station on a single line is scanned before switching to a different line to scan additional remote stations.

In addition to binary status and alarm indications the present system can gather data and measurements from transducers located throughout the system. This function will be described as telemetering and may be defined as the transmission of instrument readings from the point where the instrument is located to the different location. This information in the form of digitized analog signals may be returned to the master station during the normal scan sequence or it may be accumulated at programmed intervals.

Furthermore, data can be retrieved by the operator at any time by operating a demand push button. Analog data gathered at the remote stations may be displayed at the master station by means of nixie tubes to display each digit or data printers or combination of both. Although data is usually telemetered as three decimal digit information, up to six digit readings may be accommodated for use of double precision transmission techniques.

While not specifically shown, retrieval of data on a programmed basis can be initiated by a data logger. The log programmer would interrupt the normal continuous scanning mode only when new data is required and thus operates asynchronously with the system. In this manner the scanning system is not required to operate at the slower speed of the data logger nor does the logger have to wait until the supervisory scan comes to the point it is waiting to log. This means supervisory telemetering information is always as up to date as possible. When data has been received it is stored temporarily so that it may be accessed for display without delaying operation of the system.

The operator may interrupt the normal scan cycle to retrieve data any time by operating a push button at the selected point from which data is desired. The data associated with the point will then be updated on the appropriate display.

The normal continuous scan mode of operation is temporarily interrupted whenever a control operation is initiated by the operator at the master station. The operator uses a two-step operation to select the point to be controlled and initiate the control function. This two-step procedure is used to guard against false operation. The operator may change control selections at any point of operation during a push button selection sequence by depressing a reset push button and reselecting the desired control action.

The control point is selected by depressing the associated select push button which lights to indicate the selected device. The operator will then depress the common control function push button to initiate the control sequence. The automatic scan is not interrupted and no control message is transmitted to the remote station until the function push button is depressed. After the function push button is depressed the automatic scan is interrupted after any scan reply message has been completed and a control message is sent to the remote station in which the device to be controlled is located.

The control message transmitted contains the address section which indicates which remote station the message is intended for and what function is to be energized for binary control such as "on" or "off." The modifier section indicates which one of a possible twelve devices is to be controlled.

The remote station performs a message security check decoding the control message and if satisfied returns the control message to the master station for verification. The master station compares the transmitted control address the received address and if security checks are satisfied transmits an "activate" address to the remote station. The format of the activate address will be the same as that of the scan address. The remote station fully operates the control devices and as this action begins, returns the activate address to the master station as an acknowledgment. The returned activate address is compared with the transmitted address. If they agree the select lamp will be extinguished and the normal scan resumed. If they do not compare an alarm will be initiated.

If the first attempt to initiate a control function has been unsuccessful a second and possibly third control attempt will be automatically initiated. An error signal will be generated if the routine cannot be completed. The automatic scan will be resumed at the end of the control cycle under all circumstances.

Point control is accomplished by means of isolated contact closure. This contact closure performed while the end element control relays at the remote station may be a timed contact closure, contact closure held until released by the seized equipment, or complementary operation.

Communications between master and remote stations may take place over virtually any type of communication facility such as voice telephone circuits, power line carrier, private line, teletypewriter channels, narrow band tone facilities or other carrier microwave circuits. Frequency shift key equipment is used when voice telephone circuits or carrier microwave facilities are used. Signal rates may range from 15 to 2400 baud. When voice grade circuits are used either two wire or four wire facilities may be used although operation is half duplex even when four wire facilities are used. That is transmission between master and remote stations are one way rather than simultaneous.

Although not shown in connection with the present system multiple lines may be accommodated by line switching. In line switching a circuit ties only one communication channel at a time to the master station. Before each message is transmitted to the master station a line switching control circuit would decode the address and cause the line switching circuit to either switch to the proper communication channel or maintain the connection with the channel previously addressed. Operation of a line switching relay would connect the transmitting and receiving equipment to the communication associated with the operated relay. Remote stations which are not on the communication main line but rather are served by lesser grade communication lines may also be accommodated. This is accomplished by providing rekeying equipment as an interface between the communication facilities of different capabilities. The master station would communicate directly with the non-main line station at the transmission rate of a lesser grade. Switching to the lesser grade line if required would be treated as a control function of the main line remote station at which the lesser grade lines were terminated.

REMOTE STATION

Referring now to FIGS. 4 through 10 inclusive arranged as shown in FIG. 31, a typical remote station consists of a data set such as 860, remote station control circuitry comprising scan sequencer 450, shift register loading control 520, shift register 530, address decoder 540, data gate 850, transmitter control 910, reset circuit 920, security circuit 940, system clock 950 and bit counter 960. The remote station also includes input circuitry as represented by analog data points 410 and 420 and binary data points 810 and 820, as well as the end element control circuitry shown in FIGS. 6, 7 and 10, including the individual control relays such as 791 through 799 shown in FIG. 7. In addition, but not shown on the referenced drawings, each remote station will be equipped with its own power supply providing all necessary potentials.

The data set 860 provides a means to transmit and receive data and serves as the interface with the communication link. The remote station control circuitry will perform such tasks as internal timing, transmission synchronization, parallel to serial and serial to parallel conversions, message security encoding and decoding, and address decoding. The input circuitry serves as an interface between the work devices being supervised by the system and the remote station control circuitry to control work devices associated with the end element control relays.

The data set as used in the present system is Automatic Electric Model 2024CL. This device, employed in tone signaling systems, is an asynchronous frequency shift keying data set. As a transmitter it accepts binary digits (bits) in the form of D.C. pulses from the remote station control and transmits them to the master station as one of two tones; one tone for a binary ONE (the mark frequencies), and a different tone for a binary ZERO (the space frequency). Conversely as a receiver it accepts bits in the form of tones from the master station and converts them to D.C. pulses for use by the remote station control. Other transmission equipment may be used for the present system such as the Western Electric Model 202 Data Sets, voice frequency carrier data sets as manufactured by RFL Company and polar relays. The choice of transmission equipment is primarily determined by the transmission rate desired and the type and grade of communication facility to be used.

The remote station control circuitry contains the error detection security network 940, the transmit and receive shift register 530, address decoder 540, and appropriate logic circuitry for the control of these devices. Messages from the master station are received by the data set 860 and shifted serially through data gate 850 and shift register loading control 520 into the shift register 530. As the message is received, code checks are performed by the security circuit 940 to determine if a transmission error has occurred and then address decoding will be performed by address decoder 540 to determine if the message is meant for the particular remote station rather than another showing the same communication link. After a successful code check and address decoding, the remote station control will apply a pre-transmission mark signal to the line and after a line settling period initiate a reply message to the master station.

The first section of the message received by the remote station is sent back, followed by additional data framed in the message block format as it is developed by the binary data points or the analog to digital converter. A synchronizing start bit precedes each block of information as a stop or end of message bit is appended to each message block in the transmission. During the transmission of the message, the remote station control regulates the information flow from the input circuitry to the data set, framing the data into the appropriate format and appending the five message security check bits to each message block.

Before explaining the operation of the remote station control circuit in detail, the message format, that is the line which is used in communication between master and remote stations, must be reviewed.

The basic data communication information unit is the "block." Each transmission from the master station to the remote station will contain one block; however, transmission from remote station to master station may contain from one to eight blocks, depending upon the number of bits required to present the information to be transferred. Each block is constituted of two thirteen bit data sections and a five bit security section forming a total of thirty-one bits. The identity of each block within a transmission is a function of its position within the serial data strain. That is, each block is an independent unit whose integrity is independent of other blocks in the transmission.

A single block incurring an error in transmission in no may invalidates preceding or succeeding blocks. When transmitted serially the two data sections precede the security section. Each thirteen bit data section contains twelve bits of intelligence and one bit used for internal purposes. These internally used bits have been arbitrarily designated as bits A and B for easy reference. There are no restrictions on the format that data must be in for transmission. Each section may contain twelve on-off indications or the result of an A and B balancing.

The master station transmits a twelve bit address contained within the first section of a one block message. The second section of the block is not used in the case of scan address transmissions, but to satisfy the message security format redundant binary digits are transmitted. The remote station reply always includes as the first section of the first block, the scan address that initiated the reply transmission. Subsequent data sections, as many as fifteen, contain filed data, that is either a digitized analog signal or twelve alarms or similar indications. Should only the first section of a block be required the second section is artifically fabricated so as to satisfy the message security format. Addressing is based on a per reply basis rather than a per point basis. Each address when used to scan has the power to cause the remote station to initiate an eight block reply. This reply can contain as many as fifteen analog values or one hundred eighty alarms or indications or combinations thereof. If fewer addresses are necessary within such a system each address consists of twelve bits which may be divided into three three-bit digits. The digits are coded in an octal format (4, 2, 1). This addressing scheme makes 512 addresses available. The remaining three bits of an address section are used to select the type of operation required when the remote station is to perform a control function. The use of these bits will be discussed later. The error detection code utilized in the system is predicated upon use of a Bose-Chaudhuri cyclic code.

The remote station control circuit performs all encoding and decoding associated with message security and error detection. It contains a thirteen bit shift register 530 that serves as a serial to parallel converter when receiving a message and as a parallel to serial converter when transmitting a message. All addresses received by the remote station are stored in the shift register and then an address decoding is attempted to determine if the message is meant for the particular remote station rather than another on the same line. Should the decode be successful, a mark signal will be applied to the line and after a line setting period initiating a transmit to the master station with a start bit. Data from the analog to digital converter 510 and from the data points 410, 420, 810 and 820 is then presented serially to the data set 860. Each block of data is followed by a stop or start bit depending on whether subsequent blocks are to follow. Remote station control regulates the data flow to and from the data set by way of data gate 850 and generates the necessary signals to assure the proper information flow from the afore-mentioned data points and the analog to digital converter. It also provides some of the necessary control functions for the end element control circuit disclosed in FIGS. 6, 7 and 10. The remote station control can best be explained by dividing it into its various functional sections discussing the operation of these sections.

Figure 9:
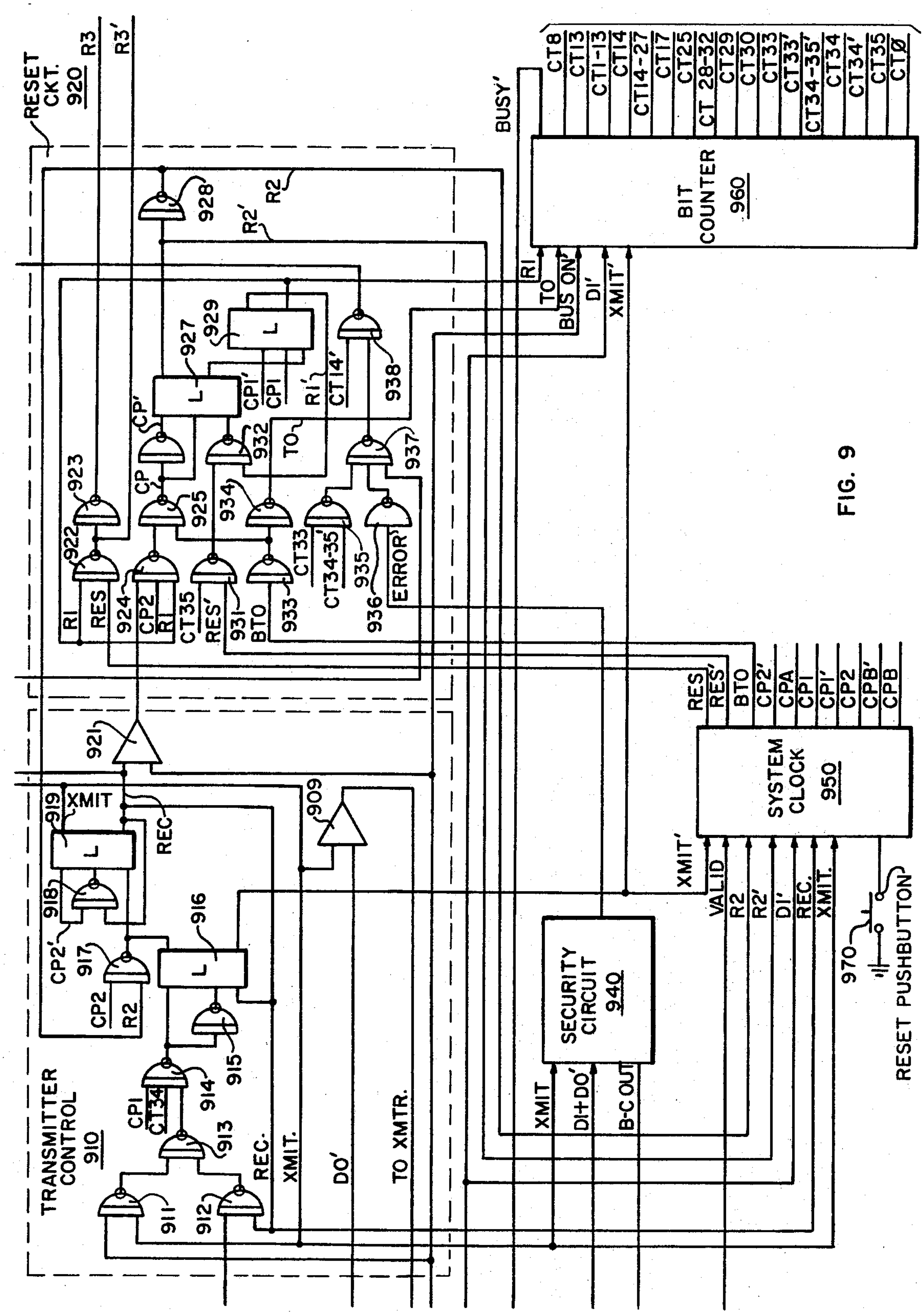

The remote station system clock 950 shown in FIG. 9 as used in the system is a two-phase device (crystal controlled oscillator) which will generate clock pulses of three microsecond duration at a frequency of 38.4 kc. or 7.68 kc. The basic or system clock pulses are referred to as CP1 and CP2 throughout the remote station. A second set of clock pulses referred to as CPA and CPB are derived from the basic set for transmission purposes. Any similar clock circuitry that can supply the required pulses would be satisfactory for use in the system such as this and the present system is not limited to the type of clock circuitry described. Additional clock pulses such as the CPB′, CP2′ and CP1′ are also derived by means of logical configurations to provide required pulses of appropriate duration. It should be noted that the rate of clock pulses CPA and CPB are directly related to the transmission speed. One clock pulse of each phase must occur for each bit of information that is to be transmitted or received.

The entire operation of remote station control circuitry is based on what count is stored in the bit counter 960. This counter is a simple binary counter able to count from zero through thirty-five. Each count may be considered as discrete state. Generally the bit counter is advanced as a function of clock pulse CPB in special cases as CP2. Outputs representing one or combinations of one or more counts are utilized throughout the system. A discussion of some of these counts and their purpose follows: CT0 may be thought of as the initial or reset condition of the counter. It is this CT0 condition that the remote station control can accept a start bit when it is in the transmit mode, the counter will pass through the CT0 position before each block is transmitted. Counts CT1 and CT13 are each associated with one bit of data in the first section of the data block. This is true whether the remote station control is in the transmit or receive mode of operation. Count CT14 is used to sequence data input cards and will be described in detail later. CT15 to CT27 are the counts of the second section of a data block. Each bit being associated with one of these counts. In the discussion of message format it was mentioned that each data block was preceded by a start bit and the last data block was followed by end of message bit. The end of message bit is monitored by the remote station control by a count of CT33 when in the receive mode and when the transmit mode the gating of this bit is performed during this same count. It should be noted that the logic permits the counter to advance from a count of CT33 to CT0 on the next CPA pulse when in the transmit mode, providing an additional data block is to be transmitted and in the receive mode if the start bit is encoded. The count of CT34 causes the mode of operation that is transmitted or received to be changed or complemented on this count. Whenever the remote station control changes mode the counter will advance through the count of CT35. If the remote is going into the transmit mode the pre-transmission mark is generated while in this count. If the remote has just received a transmission and is returning to the receive mode, a squelch delay is provided during this count. The duration of the pre-transmission mark in the squelch delay are variable. The output of this timer is used to reset the counter from CT35 to CT0.

The security circuit 940 that performs the encoding and decoding of the five check bits may be thought of as a five bit shift register employing two exclusive OR gates at a six input AND gate. The error check is satisfied if the five bit register has all zeros after receipt of a complete message. This condition is decoded by the six input AND gate, that is an error is present if a logical zero is present on any one of the six in response to receipt of CT0 and CPA. The register is loaded on CPA's and shifted on CPB's. When in the transmit mode both exclusive OR gates are disabled while the check bits are being shifted onto the line (CT28 through CT32). It should be noted that the input to the circuits is made up of data in or data out. This is necessary since the data to be transmitted as well as the data being received must be monitored by this circuit to allow the generation and checking of the check bits in the respective modes of operation.

Included in the system clock 950 are the necessary logic configurations that will determine when pulses CPA and CPB will be generated. When the idle condition (CT0) this circuit will start generation of transmission clock pulses after the recognition of the start pulse on the line. It will also start the transmission clock when the remote station has data to be transmitted to the master station and the bit counter is in the CT0 position. The sampling of the start bit requires some clarification. The clock is started upon recognition of the leading edge of the start bit, however, a second check for the presence of a start bit is performed during the interval when both CT0 and CPA are present. If the second check is not successful, the remote station control will return to idle. Realizing that a CPA pulse preceded a CPB pulse the bit counter 960 will not leave the idle or CT0 state.

The bit counter 960 is controlled by logic circuitry to assure synchronization when starting the counter.

The shift register 530 disclosed is of conventional configuration. It is a thirteen bit shift register performing parallel to serial and serial to parallel conversion. The primary latches of which it is composed shift on CPA pulses and the secondary latches on CPB. The parallel loading into the primary latches is performed on CT29 and CT13 for the first and second section of the message respectively. The five check bits are not loaded into this register, but rather are shifted out of their own five bit shift register, the security circuit previously mentioned. When in the receive mode the second section of the address data block is not shifted into the shift register 530. The address decoder 540 coupled to the parallel output of the shift register 530 is a simple diode strapping field providing up to thirteen addresses as shown here from the shift register coded output, for use in the selection of address points, as well as an additional coded output shown as PI in FIG. 5 that is used to initiate a scan sequence by selecting the first point in a scan group. Also derived from the address decoder is an enable lead that permits decoding of an address under the following conditions. During CT14 a tentative decode of an address will be made. In response to enablement of the error not, not bit A and a count of CT33 through CT35 the decoder will be enabled. This assures that a complete message has been received (CT33 to CT35) and an error detection network is satisfied that the message has not been distorted as indicated by the error not marking and that bit A is a logic zero. It was previously mentioned that bits A and B were used internally. Bit A is used to indicate that a block of data contains an address when in the zero state. Subsequent blocks of data transmitted will have a logic one in bit position A to prevent other remotes from decoding this data as an address.

The scan sequencer 450 generates the necessary clocking signals required to advance from one data point circuit to the next in a given chain. It also generates the control signals required by the analog to digital converter 510. As can be noted by reference to FIGS. 4 to 8 each data input card has two latches such as 415 and 416 which are wired in a shift register configuration. The decoded address from the address decoder 540 serves as an input via lead PI to the latch 415 for example in the analog data point 410. A sequence of clock pulses shifts this input signal through the counting chain consisting of several data points tied in series. In the present instance only one counting chain has been shown consisting of analog data point 410 and undetermined number of intermediate analog data points to 420 and from analog data point 420 to binary data point 810, then through on determine the amount of intermediate binary data points to the final binary data point 820.

It should be noted at this time that additional chains or series of data points could also be accommodated in the system and that a special address from the address decoder 540 would be required to initiate operation of the first data point in each chain.

A C2 pulse generated by this scan sequencer 450 will set latch 415 of the data point 410 providing it has input signal on the PI lead. A C1 pulse will set latch 416. The setting of latch 416 will prime the input of the next data point in the chain and the next C2 pulse will reset latch 415 of the first input point and simultaneously set the corresponding latch of the following data point.

A data point is enabled (if status is available for loading into the shift register or to be converted by the analog to digital converter) when latch A is in a false or not state and latch B is in a true state. The scan sequencer 450 generates the C1 and C2 signals required. The C1 pulses are generated during the counted of CT14 and CT30 and the C2 pulses are generated during CT17 and CT33. After latch 415 for example has been set in the analog data point 410 the A to D balance signal will be generated by the scan sequencer 450 and extended to the analog to digital converter 510. There is a delay required to insure operation of the relay contacts associated with relay 413 which extend to selected analog signal to the analog to digital converter 510. The command to balance is gated to the analog to digital converter on counts CT8 and CT25, thus the balance A to D signals are generated while data is being transmitted. This prebalancing of the analog to digital converter allows the remote station control circuitry to transmit two analog values in one data block.

Double transmission of data is accomplished by terminating the advance of the counting chain and loading the same data in the second section of a given data block. This is accomplished by preventing the generation of CP2 during CT33 and CP1 in CT30. It should be noted that a double transmission data point must not start in section 2 of a data block. This is accommodated by first restricting the CP1 and CP2 clock pulses and gating the input of the shift register in such a way that the upper precision data is loaded during CT29 to be transmitted in section 1 of the data block and the load of precision data is loaded during CT13 to be transmitted in section 2 of the data block.

The scan sequencer 450 receives information from each data point via common busses to indicate whether their point reporting requires the use of the analog to digital converter if the input point is an analog data point, and it does not require the use of the A to D converter if it is a binary data point such as 810, that it requires double precision, or double transmission, or combination of both. The particular requirements of each input point are determined by diode straps such as 431 and 432 in analog data point 410 which for example would indicate that data point 410 requires the use of the analog to digital converter and also double precision. In a similar manner data point 420 by virtue of its diode strap 433 indicates that it requires the use of the analog to digital converter and in binary data point 810 the diode straps 831 and 832 indicate that the use of the analog to digital converter is not required but that double transmission is required. In a similar manner binary data point 820 by means of diode strap 833 indicates that it does not require the analog to digital converter. It is to be understood that any combination of diode strapping might be employed at any given point. The only restriction being that analog data points must so indicate the requirement for use of the analog to digital converter, and binary data points the requirement for non use of the A to D converter.

The three principal leads from the remote station control to the data set 860 include the data out lead where a marking of logical one on the lead will be interpreted by the data set as requested to place a mark condition on the line, the data in lead which when a logical one condition appears on this lead indicates a mark condition on the line and the transmitter on lead which will have a logical one condition applied to it when the remote station is in the transmit mode.

Both automatic and manually initiated system reset commands are generated in connection with the system clock 950 and reset circuit 920. Manual reset as the name implies is developed by depression of reset push button 970. Automatic reset will be generated whenever power is turned on or restored after momentary power failure. The automatic reset signal will be present for a period of time after power is restored. This delay is required since the clock 950 will experience a delay before generating clock pulses after power is turned on and reset is defined as a coincidence of CP1 or CP2 and the reset signal.

Reset must be synchronized with system clock pulses to facilitate the proper resetting of some circuits. The synchronization is implemented by latches 927 and 929 in the reset circuit 920.

TYPICAL OPERATION

When power is applied to the remote station the system clock 950 will generate the initial reset command. This reset will persist long enough to insure that the clock has started and all circuits within the remote station have been reset. At this time the bit counter will be at count zero and all the data points will be disabled or reset and the data set 860 will be monitoring the communication link in the receive mode.

The remote station will remain in this idle or reset mode until a start bit (SPACE) on the transmission line is detected. Upon detection of the leading edge of a start bit the system clock will be started. This action will be considered as a tentative acceptance of the start bit since a check will again be made for a space on the line when the first CPA pulse is generated. If a "MARK" indicating a false start, probably due to noise on the transmission line, is detected the remote station will return to the reset condition. If this second check of the start bit is successful, the bit counter will advance from the CT0 to CT1 state when the first CPB pulse occurs. The first bit of incoming data will be accepted and loaded into the shift register through the data gate 850 and shift register loading control circuit 520 into the shift register 530. Likewise the security circuit 940 will check the incoming information when the CPA pulse occurs. When the CPB occurs the shift register will be shifted one bit, the security network 940 will shift one bit and the bit counter 960 will advance to the count of CT2. This sequential loading in response to CPA pulses and shifting in response to CPB pulses will continue until the CT14 count is arirved at. At this point the first section of the message will be stored in the shift register 530. Section two in the five check bits are gated to the security network while the bit counter is incremented from the count of CT15 to CT32. A tentative decode of the address circuit is performed for use in connection with the end element control circuitry of FIGS. 6, 7 and 10 during CT14 to determine if section two of the message being received should be gated to the modified register 750 associated with the end element control. Realizing that the security circuit cannot determine if the received message is valid until all thirty-one bits in the message clock have been received, the decoding of the control address during CT14 is considered a tentative decoding. The final acceptance of the message will occur during CT33. During the CT33 period a check is made for the presence of a stop bit (MARK) on the line. If this check is not successful the counter will return to the CT0 state since the remote station has obviously been receiving a message intended for the master station from another remote. If a stop bit is recognized the address decoder 540 will be enabled to determine if the message is intended for the remote station control. At this point the remote station control circuitry based on the presence or absence of a decoded valid address will squelch the receiver of the data set 860 and switch to the transmit mode and start transmitting the pre-transmission mark. This decision and delay are performed during the CT34 period and CT35 respectively. The decoded scan address will be stored by latch 415 of the first data point for ten during CT33. The counter will again return to CT0 after the required pretransmission mark was generated and during the CT0 period generate a start bit and shift the address out onto the line.

This latter occurs over a path extending from the shift register through the shift register loading control and the data gate to the data set 860.

The stored address will be transmitted during counts CT1 to CT13 as the first section of a first block intended for receipt by the master station. During count CT13 data is loaded in the primary level of the shift register and is transmitted during counts CT14 through CT27. While the second section is being transmitted the data point counting chain will be advanced in preparation for the gating and transmission of subsequent sections. The check bits are transmitted during counts CT28 through CT32. If additional data is to be transmitted that is if the data point is still enabled, the counter will again return to CT0 from CT33 for the transmission of additional data blocks. When all requested data has been transmitted the transmitter will be turned off during count CT34 and the receiver squelched during CT35 returning the remote station to the idle condition, that is during the CT0 count and the receive mode. The station will remain in this condition until it detects a start bit on the transmission line.

The input circuitry consisting of analog data points 410 through 420 and binary data points 810 through 820 form the interface between contacts such as 801, 802, 803 and 804 providing binary status information or transducers such as 411 and 421 providing analog values and the remaining portions of the remote station. Contact closures such as closure of contacts 801, 802, etc. are converted into signals usable by the remote station and gated onto appropriate busses at the proper time during the normal scan. The transducer outputs 411, 421, etc. are converted into signals acceptable to the analog to digital converter 510. These signals are gated into the analog to digital converter input bus at the proper time during the normal scan also. The scale and filter circuits such as 412 is included in each of the analog data point circuits. The scale and filter circuit interfacing between the transducers and the analog to digital converter filters out excessive noise and also scales the output voltage of the transducer so that it may be measured in engineering units with the analog to digital converter. For example a pressure reading of 999 lbs. per square inch must correspond to 999 millivolts.

The analog to digital converter 510 is a device useful to measure in the present system millivolt D.C. signals based on converted analog values and convert this measurement to a digital code. As utilized here a voltage range of .000 to .999 volts is permitted to provide a wide range of values. With analog values converted into digital values and encoded on a 12 bit basis a maximum reading of 999 can be obtained. Inputs to the analog to digital converter are connected to the various analog input points to measure the desired current signals. Typical analog quantities which might be transducer sensed and subsequently measured include temperature, pressure, acceleration, vibration, tank level, light intensity, and valve position. As utilized in the present system the analog to digital converter is of conventional design being a balancing type of digital potentiometer.

Figure 6:
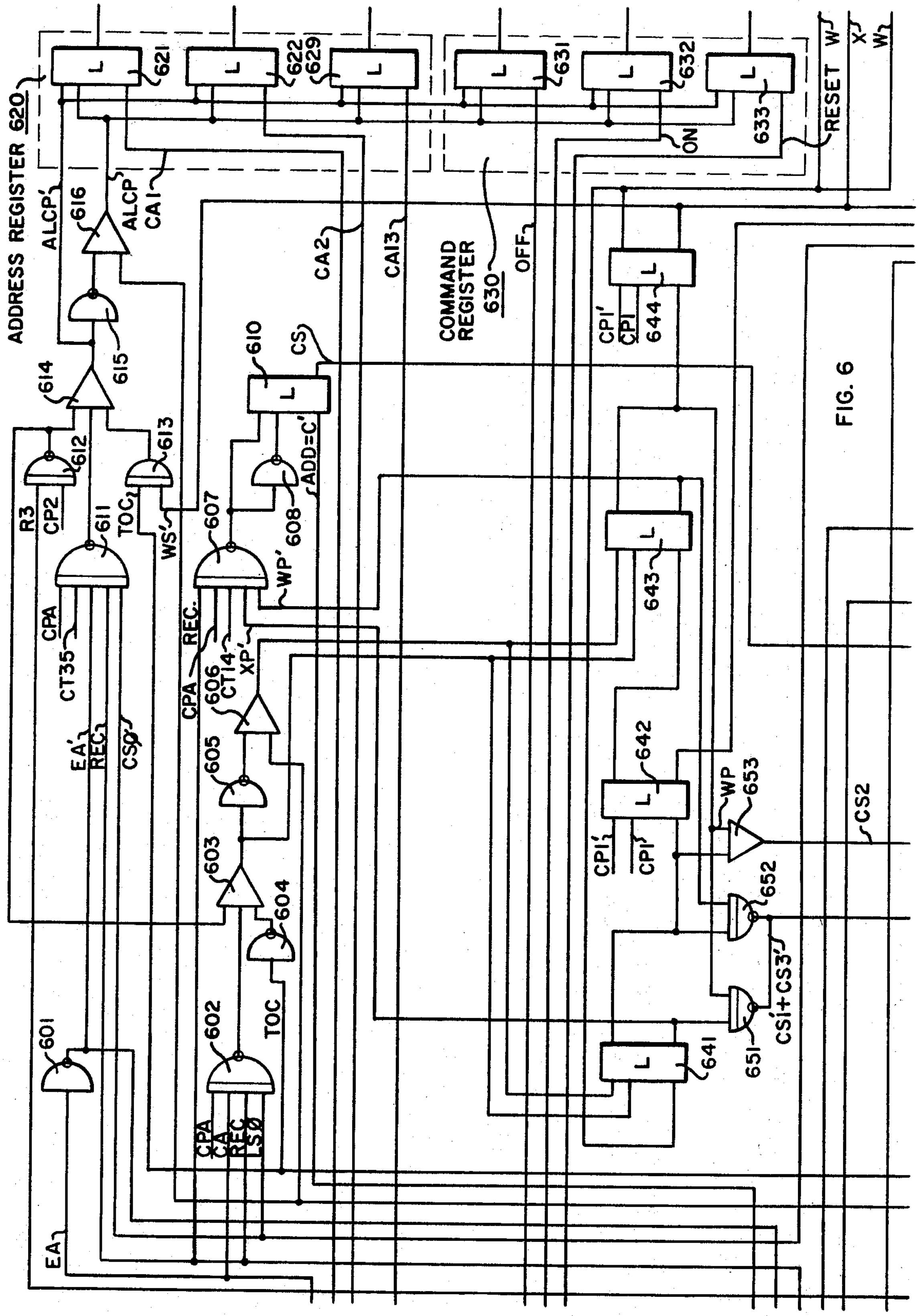
Figure 7:
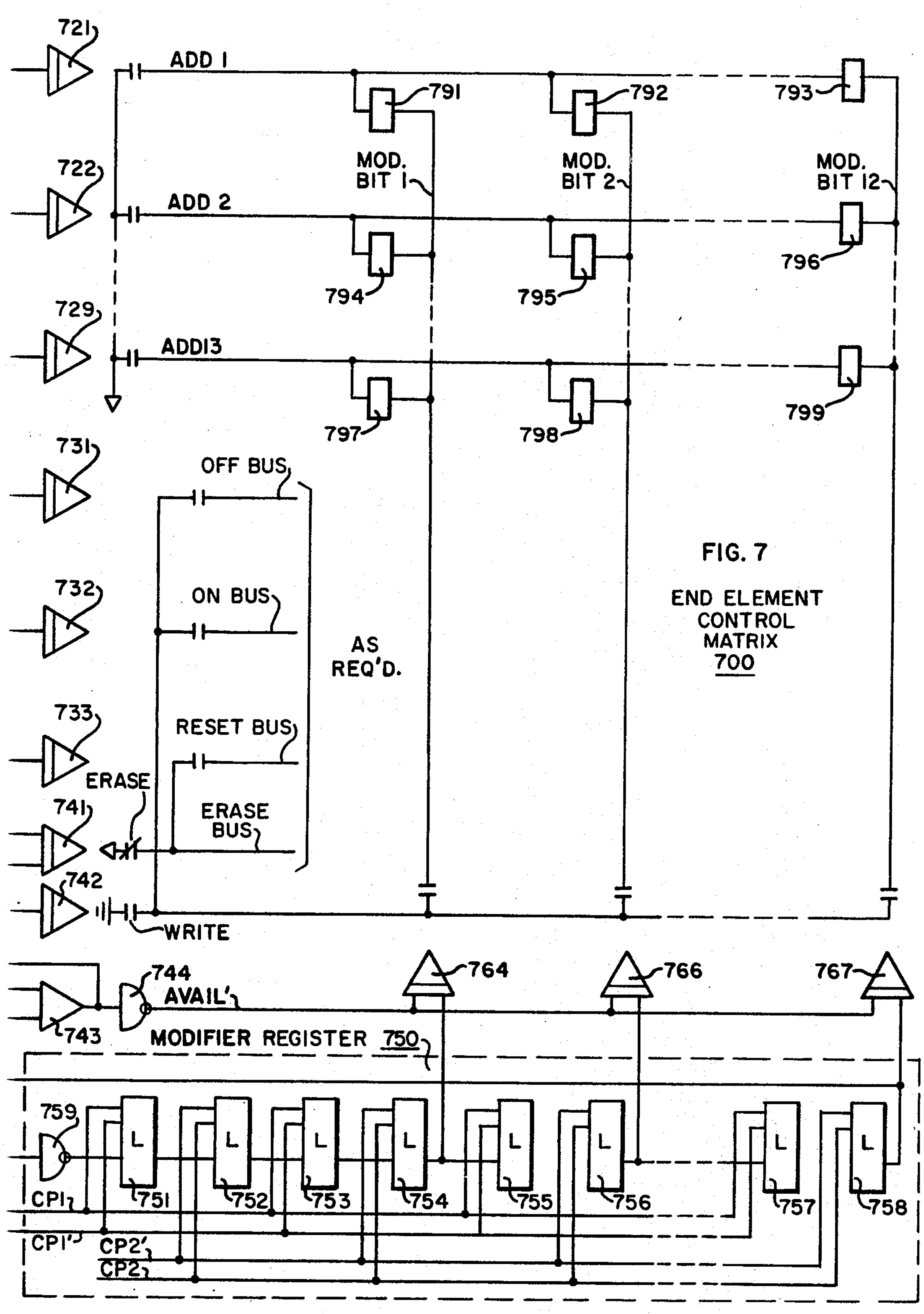
Figure 10:
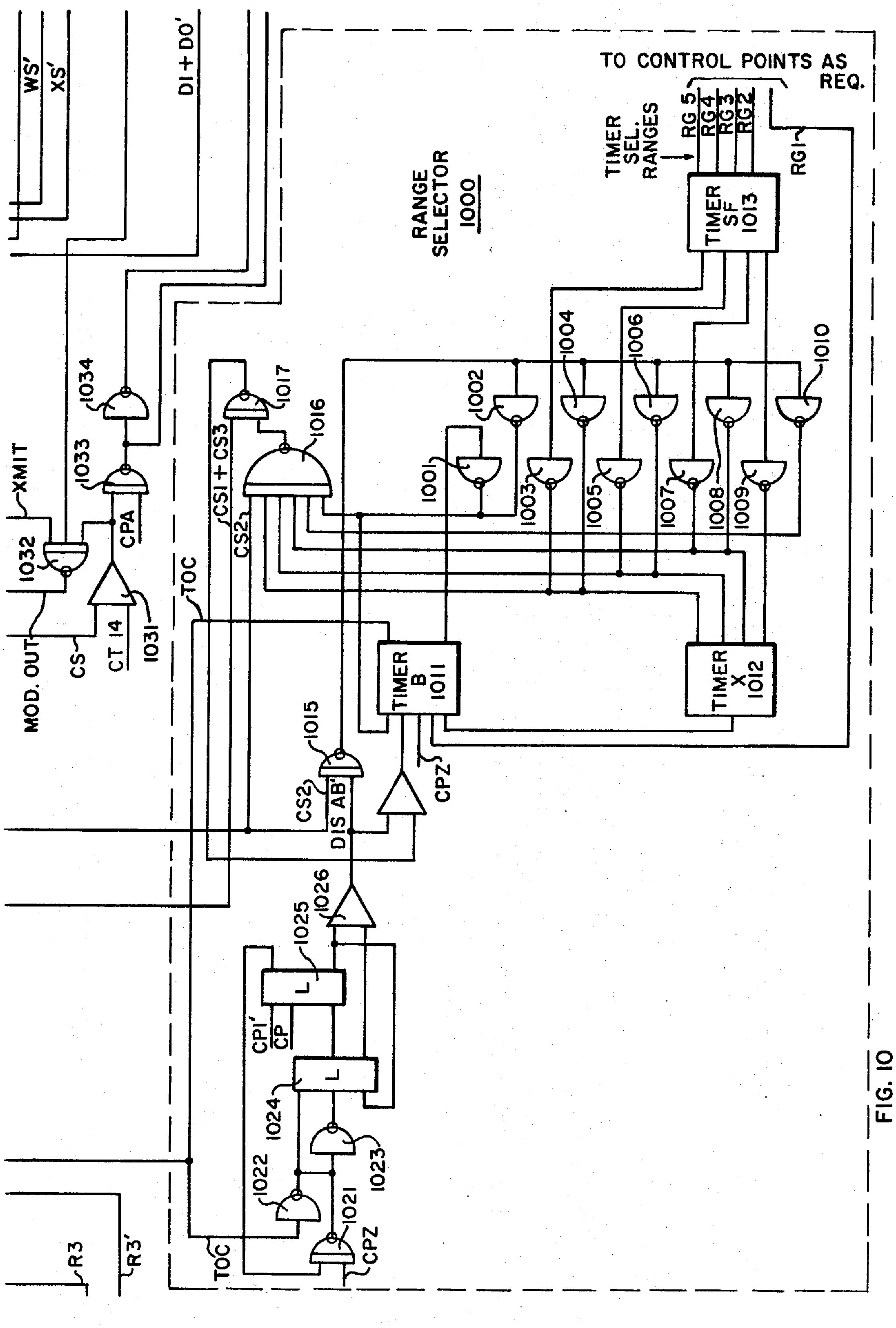

The end element control circuitry disclosed in FIGS. 6, 7 and 10 is the common circuitry used to establish the output interface for all controllable devices associated with the remote station. In the address register 620 it stores the decode control adress in the command register 630, the appropriate command operation and it modifies register 750 any modifier bits presented from the remote station control circuitry. In addition it insures the check before operate control message sequence is properly completed and upon receiving the activate address regulates the controlling signals. The output of the end element control circuitry may be applied to end element control devices such as digital to analog converters, standard control relays, interposed relays or codel reeds. The output interface created by the end element control consists essentially of a two dimensional matrix formed by the address or modifier bits register outputs. Common timing leads are also developed to permit variable length output pulses. A reset lead is provided to reset lead relays or similar devices. Typical equipment that might be controlled by the end element control relays such as 791 through 799 might be pumps, valves, compressors, generators, circuit breakers, switches, controllers, etc.

Referring now to FIGS. 6, 7 and 10 arranged as shown in FIG. 31, the end element control circuitry receives signals via lead D1+D0′ which causes to receive and store the thirteen bit modifier portion of the message being received; and upon a successful decoding store in the address register 620 the decode control address. When the remote station control circuitry is in the transit mode the end element control circuitry will receive instructions to transmit the modifier, however because the modifier register is a circular shifting register consisting of latches L751 through L758 a twelve bit highway is brought out from the modifier register through drivers 764, 766 and the intermediate drivers not shown and driver 767. The end element control circuitry is equipped to individually store up to thirteen control addresses in the address register 620 which includes latch 621, 622 and a group of intermediate registers, not shown and finally latch 629. The output of this register consists of the drivers 721, 722, a group of intermediate drivers, not shown, and driver 729. From these drivers thirteen address leads are developed. In this manner a two dimension matrix twelve bits wide and up to thirteen bits long can be developed. By marking a bit in the modifier register and storing an address in the address register a unique point in the matrix is defined. At this point relays such as the relays 791 through 799 are wired, for example, a control address that would be stored in the address register 620 in latch 621 and operate driver 721 and a modifier bit that would be stored in latch 754 and operate driver 764 would in combination develop the necessary operating path for relay 791. In a similar manner other modifier bits and other stored addresses will select other points or relays in the matrix.

Although a particular relay is selected it cannot be operated until execute or write address has been received. The master station after checking the message returned from the remote station, if always in order, sends the execute or write address. Receipt of this address causes the bit counter to leave the idle state and as it moves through the active states the bit counter in conjunction with the range selector 1000 generates signals which operate the selected relay in the matrix for a period of time as long as five seconds or as short as twenty milliseconds. The manner in which this is determined will be discussed later. It is during the active operation of the bit counter that the control instructions sent by the master station are being executed and the end element control circuitry will not accept any instructions from the station control circuit. When the bit counter returns to its idled state it clears the address storage and can accept further instructions from the remote station control circuitry.

During the count of CT14 the remote station control performs a tentative decode of a received address. If the decoded address has been assigned to a control function at this remote station, the ADD=C signal will be extended to latch 610 at the occurrence of the next CP1 pulse that occurs during count 14, and will be stored in latch 610. This storing operation will occur only when the remote station control is in the receive mode and the end element control is in a CS0 state as determined by the state of latches 641 through 644 which comprise the internal counting mechanism for the end element control circuitry. The output of latch 610 will cause the modifier bit to be received and transmitted. This latch is only changed during a count of CT14.

The modifier register 750 as shown in FIG. 7 is a thirteen bit shift register. The primary latches receive gated CPA pulses while the secondary latches receive CP2 pulses direct from the system clock 950. The input to the shift register is either the data in from the master station or the data out to the master staion. In his manner he modifier register is a circular shifting register when the remote station is transmitting the modifier. The register receives and stores the twelve modifier bits and the "BA" bit of the modifier portion will receive the message.

The true side of the primary latches which store the twelve modifier bits form a twelve bit electronic output highway not shown in the present disclosure but however usable for selection of electronic devices. The true side of the secondary latches storing the twelve modifier bits are wired to the drivers 751 through 758. Thus one side of these drivers develop the twelve bit hard contact output highways. The other side of the contacts is commoned to the make contact with the associated write driver 742. The drivers 764 through 767 are allowed to operate only when CS1, CS2 or CS3 states are present from the output of the latches 641 through 644 which constitute the internal bit counter for the end element control circuitry. It was noted previously that twelve hard bit contacts stemming from the outputs of the modifier register will form one side of a two dimensional matrix. This matrix will be discussed in more detail in the following.

The end element control circuitry as shown permits storage of up to thirteen control addresses. The address register consisting of latches 621, 622 and a group of intermediate registers, not shown, terminating with latch 629 is reset whenever the reset push button in the station control is depressed. The true side of the address register latches is brought out of the circuit into the drivers 721, 722 and another group of drivers, not shown, and driver 729 to form a hard contact output highway. This highway forms the second side of the two dimensional matrix referred to above. The other side of the driver contacts is common and wired to a positive terminal power source used to operate the end element relays 791 through 799. The address register relays are prepared primarily in response to receipt of an enable pulse from the address decoder 540 of the remote station control circuit. This signal in combination with other gating pulses and the decoded address signal from the address decoder will select the specific driver to be operated in the selection of the end element in the control relay.

As we have noted the hard contact outputs of the modifier register 750 and the address register 620 form a two dimensional matrix. A given modifier bit and an address will define the unique point in the matrix. These appear as relays at the intersection of a given address output and each of the modifier outputs. A given modifier bit with the address bit will select the relay that is wired at their intersection.

Also included in the end element control circuitry are the three common control function latches 631, 632 and 633 which comprise the command register 630 of FIG. 6. These latches are used to restore the off-on and reset bits. These bits are received by the remote station and are located in the address section of the incoming message as bits 10, 11 and 12 respectively of section A. They are stored in their respective latches at the time the decoded control address is stored. The true side of each of the three latches drives the drivers 731, 732 and 733 respectively. These drivers operate when the bit counter internal to the end element control provides the necessary output markings. One side of the contacts associated with the off and on drivers 731 and 732 respectively is commoned through the contact associated with write driver 742 to pick up ground when that driver is operated. The other side of the contacts associated with the off and on drivers are wired to the contacts utilized for off and on operation of relays selected by the end element relays discussed above. The contact associated with the reset driver 733 is wired to battery through the contact associated with the erase driver 741 with the other side being connected through erase contacts on end element relays. These three drivers 731, 732 and 733 form the operate path for the various devices selected for control by the end element matrix of FIG. 7. The particular means with which this is accomplished will be discussed later and shown on FIG. 11.

The internal bit counter of the end element control circuitry is shown in FIG. 6 and as noted previously consists of latches 641, 642, 643, 644, and associated logic circuitry. Its purpose is to generate the proper timing sequence for operating the end element relays. It is reset in the same manner as the address storage whenever the reset push button in the station control circuit is depressed. It remains in its idle or available state (CS0) until the enable or EA address is received at which time it advances to state CS1. The occurrence of a timer output pulse advances the counter to the next state until it returns to its idle state of CS0. It should be noted that states CS1, CS2 and CS3 are decoded off the primary latches and are used in connection with the range selector circuit 1000 of FIG. 10 whereas the CS0 output is decoded off the secondary latches 643 and 644 because of timing consideration.

The write and erase drivers 742 and 741 respectively will now be discussed in detail. The erase driver is operated to close its associated contacts during the CS1 state of the bit counter while the write driver 742 operates its associated contacts during the CS1 and CS2 states. The timing sequence is such that the operating path for an end element relay such as 791 through 799 is set up via the address driver associated contacts from battery the modifier contact associated with the modifier register driver such as 764 and 767 through the make contact associated with the write driver 742 to ground so that the write as well as the erase contact is the last to operate and the first to release. It should be noted that the modifier drivers and the erase and write drivers receive their operate signal simultaneously.

Figure 8:
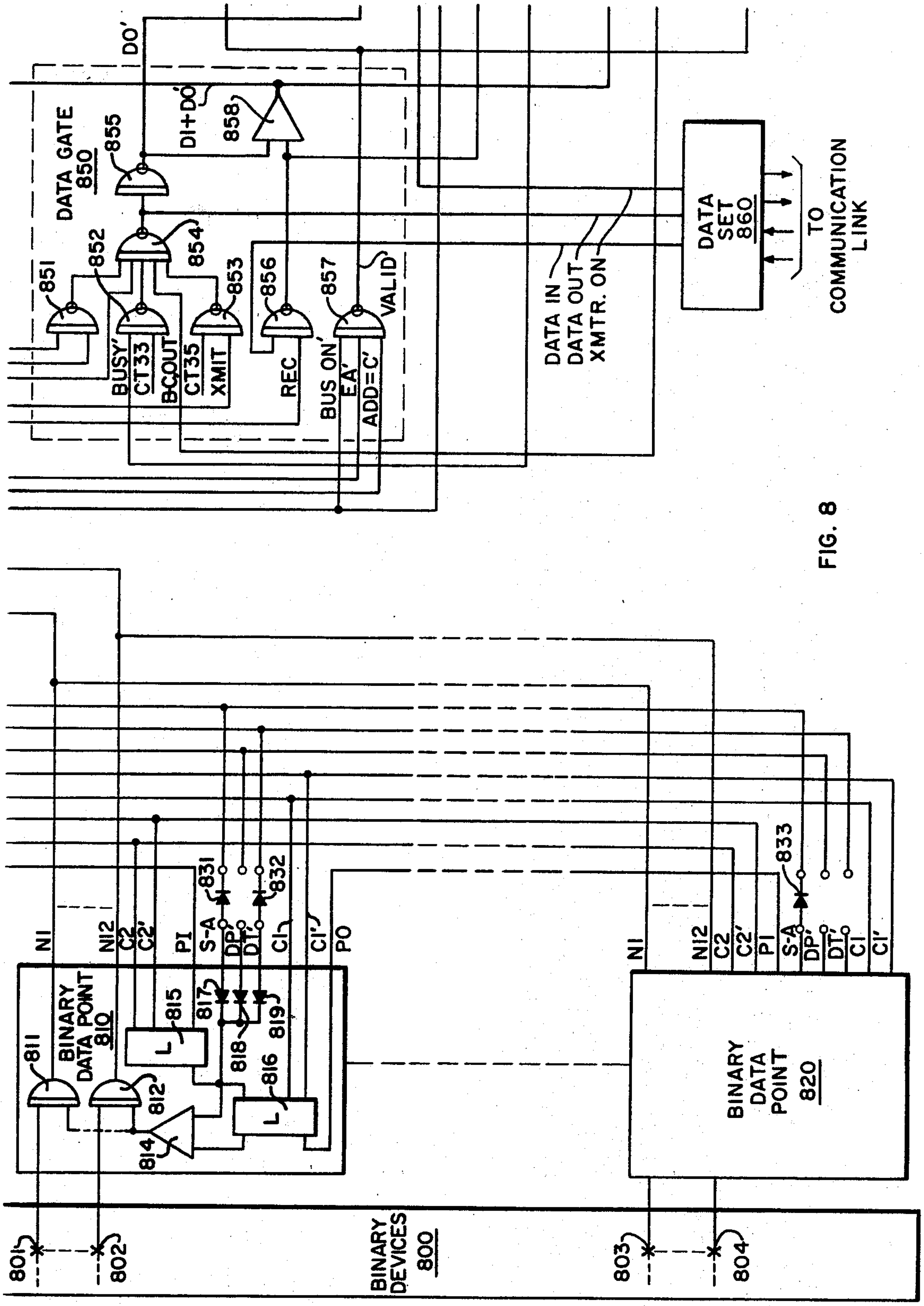

The range selector circuit 1000 shown on FIG. 10 is equipped as shown in the present instance with five adjustable time ranges. When the bit counter associated with the end element control advances from a CS0 to a CS1 state the first timing range is energized. This time period is sufficiently long to allow the write and erase relays and the end element control relays to operate. This is required so that should the system demand a longer time range than the basic range the ground signal on one of the additional ranges to be present before the end of the basic time period. This ground signal was returned by means of a contact on the selected end element control relay as shown in FIG. 8. When the bit counter advances to CS2 all timer ranges are disabled by the timer disable circuit consisting of the latches L24 and L25 and associated gating circuits. After the disable cycle is completed if a ground signal has not appeared on any of the five inputs of the range selector selecting another range the basic range will again be selected. It is by grounding one of the select range inputs that an end element relay can be operated for as long as five seconds. As the bit counter advances to CS3 all timer ranges are again disabled during the disable cycle after which the basic range is selected. This period allows the write driver to break the operate path of the selected end element relay before any of the others in the path are broken.

Reviewing the operation now the remote station control circuitry receives a control address during count CT14 of the station control bit counter 960 the tentative decode yields a ground signal that is stored by latch 610. The modifier is then shifted into the modifier register 750 during count CT15 through 27. During count CT33 the actual control message is decoded and stored in the address register 620. When the remote station control transmits out the modifier for the master to employ a check before operate control it is circularly shifted so that after the modifier has been transmitted it is also stored in the modifier register 750 as it was received. The end element control circuitry of FIGS. 6, 7 and 10 is now waiting for the execute or enable address. If the next address the remote station receives, whether valid or not, is not the valid execute address, the previously stored control address will be discarded. If the next address is a valid address, the bit counter internal to the end element control circuitry advances to a state of CS1 and the performance of the control instruction is begun. Until the internal bit counter has returned to a state of CS0 the modifier register primary clock pulses are disabled as are the load block pulses. This prevents the end element from the control circuitry from being seized. The fact that the end element control is not available does not prevent the remote station control from performing data scans of incoming data points.

Figure 11:
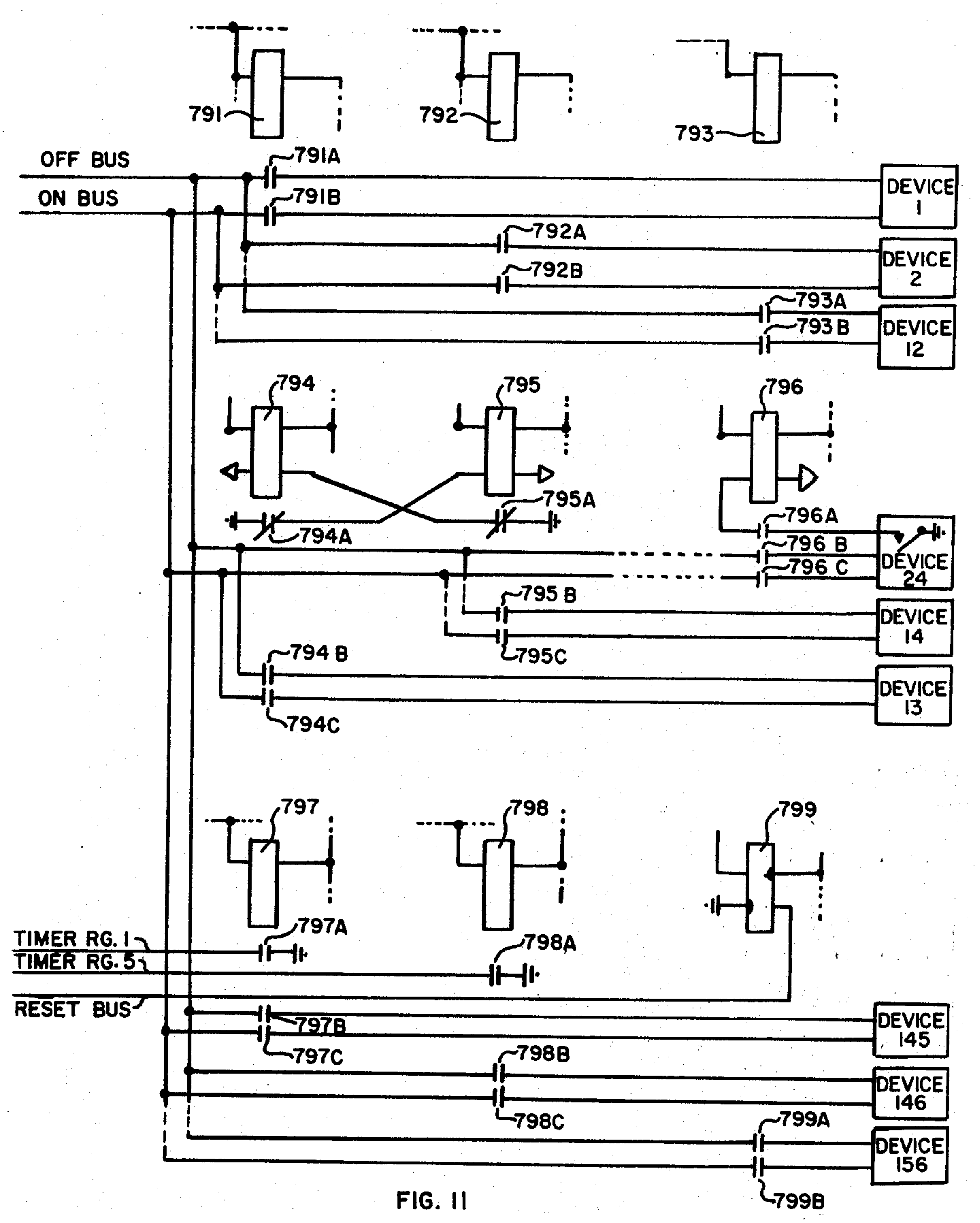

Referring now to FIG. 11 the utilization of the end element control relays as shown in FIG. 7 is shown here. For purposes of direct comparison the same numbers identifying the relays are used in both FIGS. 7 and 11. In FIG. 11 it will be observed that the selection matrix leads are not shown, and that only the end element relays themselves and their associated contacts and operational circuitry developed therefrom are included.

Relays 791, 792 and 793 demonstrate conventional on/off control of field devices such as 1, 2 and 12. As previously indicated selection of any one of these relays would be by means of a common address, and then utilization of the first modifier bit for selection of relay 791, the second modifier bit for selection of relay 792 and the twelfth modifier bit for selection of relay 793. In response to selection of any one of these relays, and operation of the "off" bus driver 731 of FIG. 7 which will have applied a ground to the "off" bus contacts such as 791A associated with relay 791, device 1 would turn off, contact 792A would turn device 2 off and contact 793A would turn device 12 off, likewise if relay driver 732 had been operated applying ground to the "on" bus, relay contact 791B, or 792B or 793B would be closed to turn devices 1, 2 or 12 on.

Relays 794 and 795 represent a complementary pair utilized to prevent operation of the associated end element relay when its complement is selected. For example when relay 794 is selected in the manner previously described it will open the normally closed contact 794A which has held relay 795 operated. In so doing any operating path via contacts 795B and 795C to device 14 are open and the operating paths to turn device 13 on or off through contacts 794B and 794C from the off and on busses are closed. Relay 794 will hold operated after the select routine is completed by virtue of the normally closed contact 795A associated with relay 795. Subsequently when relay 795 is operated relay 794 will restore.

Frequently it is necessary to hold a relay operated for a time period in excess of that provided by the end element control matrix. When a relay such as 796 is selected and operating potential is extended through contact 796B or 796C the device will return ground and through closed contact 796A will complete a holding path for relay 796. Relay 796 will then remain operated until the holding ground is removed at device 24.

Another technique for holding the end element control relays operated for a period longer than that normally provided is illustrated by relays 797 and 798. When a relay such as 797 is operated ground is returned through a contact such as 797A via the lead designated "timing range 1" which is extended to one of the several timer selector ranges shown in the range selector 1000 of FIG. 10. By virtue of the timing function of the range selector the operate period for the "off" or "on" relay drivers will be extended. Relay 798 shows a connection to timing range 5 which would cause the operating bus potential to be maintained through its associated contacts 798B or 798C for a different period of time than that selected by operation of relay 797. In this manner the specific requirements for maintenance of operating potentials to devices such as 145 and 146 can be selected for an appropriate period of time.

Relay 799 is a two coil relay including connections to the selection matrix as previously described and having a second connection to the reset bus of FIG. 7. When relay 799 is selected in the normal manner and operated it may be reset or knocked down by operation of the reset driver 733 of FIG. 7 which will close battery to the lower winding of relay 799. Since the upper and lower windings of relay 799 are in opposition the two magnetic fluxes will cancel each other and relay 799 will restore.

MASTER STATION CONTROL

The master station control circuitry disclosed in FIGS. 12 through 17 receives in parallel instructions pertaining to transmissions. It offers service based on a highest priority function to circuits requesting it, and upon completion of routines, and after performing line quieting as required, the appropriate address modifier and check bits are then shifted serially to the data set and from thence to the communication facility. The master station transmits a message, then waits for return transmission from the remote station.

The message received from the remote station will then be shifted into the master station control where security checks are performed, along with a bit by bit comparison of the transmitted message block with received message block and data is displayed or stored as required. The master station control acts to buffer the received data for a short period of time to insure its satisfactory disposal. The next message is then shifted to the data set for transmittal.

If a scan message reply is received which contains the transmission error or if no reply is received, the master station control will cause a re-interrogation of the remote station to occur. In the event that an error reply cannot be obtained after three consecutive interrogations the automatic scan will be incremented to advance in sequence and a continuous scan of remote stations and the points included therein will resume. The error interrogation counter within the master station control will count the number of interrogations. Another function performed by the master station control is to count the number of blocks received and compare this count with the stored indication of the number of blocks to be received as a result of the interrogation. If the counts do not compare a re-interrogation will be indicated.

Figure 16:
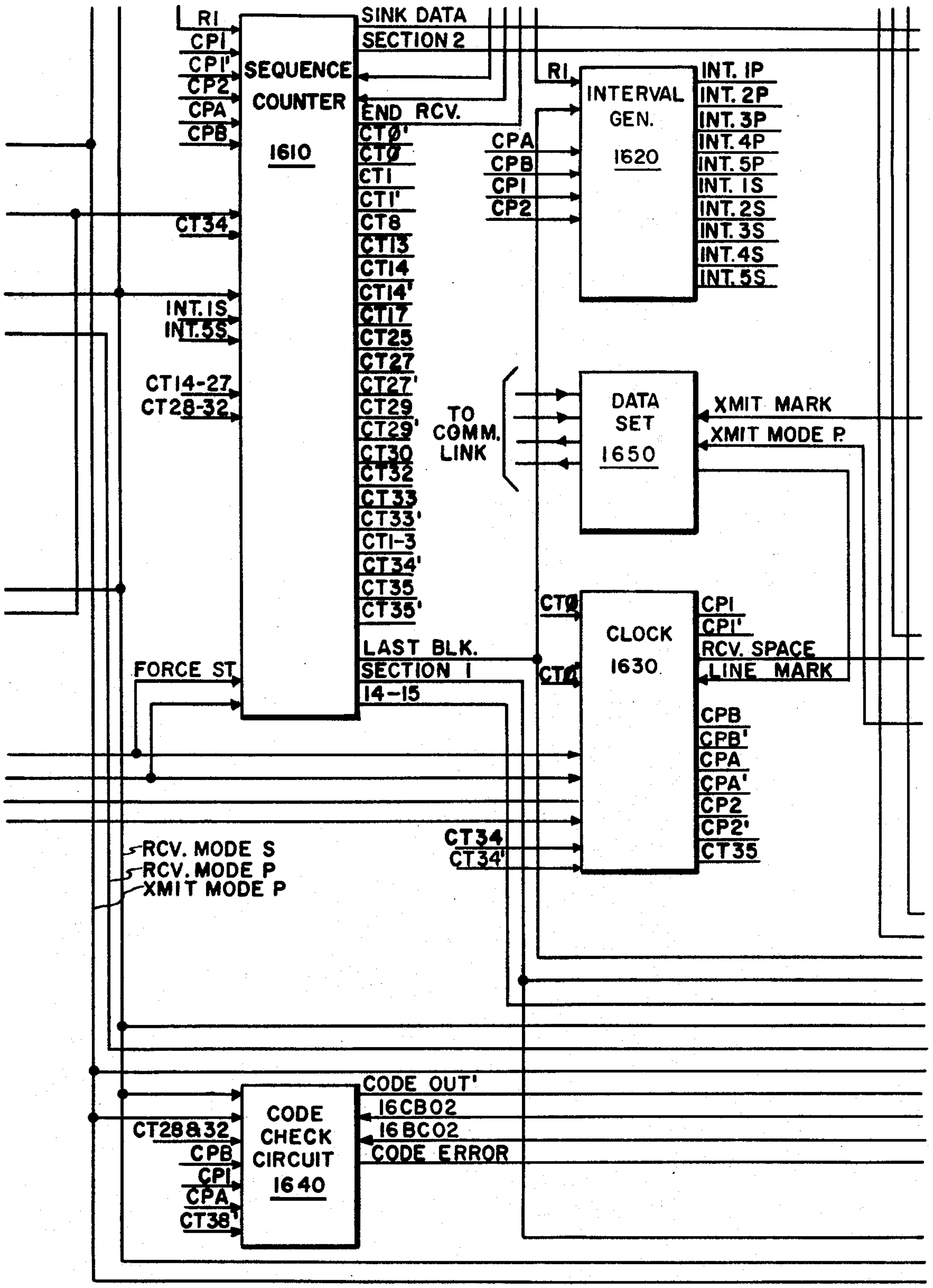

Referring now to the circuit details of the master station control, the clock 1630 shown in FIG. 16 consists of three portions. The basic system clock is of conventional design consisting of a free running two phase crystal control clock pulse source. The two phases are referred to as CP1 and CP2 throughout the system. Pulse duration and period are determined by the crystal frequency. The two pulses are 180° out of phase with respect to each other. The second portion of the transmission clock provides the transmission clock pulse which are derived from the system clock and are referred to as CPA and CPB. Both CPA and CPB are a function of CP2 and are also 180° out of phase with respect to each other.

When the transmission portion of the circuit is enabled a binary ripple counter is allowed to count the CP1's. After enough CP1's are counted to correspond to one-half a transmission bit period, a CP2 is gated through the clock becoming CPA. After enough CP1's are counted to correspond to one full transmission period, a CP2 pulse will be gated through the clock to become CPB. The counter resets and counting begins again for the next transmission bit. The number of system clock pulse counts for each transmission clock pulse is determined by the system clock frequency.

Additional pulses such as CP1′, CP2′, CPB′ and CPA′ etc. are derived by inversion of the already discussed pulses. During the receive mode, the transmission clock will start on the leading edge of a received start bit (SPACE). If by means of internal logic this is determined as a valid start bit the transmission clock will run until the end of the last block received and reset at the end of the last block.

When in the transmit mode, a control time out clock pulse will start the transmission clock counter on occasion of the next CP1 pulse. The transmission clock will then continue to run until the sequence count of 34 (CT34) when it will reset. When the transmission clock pulses are a function of the system CP2 the clock must be turned off in phase with CP1 to avoid clipping of the final clock pulse.

In case of no reply from a station the master station must return to the transmit mode to re-interrogate that point or continue to the next address. This is accomplished by forcing the transmission clock to start after the "no reply" time period, continuing through the receive mode for one block period and then continuing into the transmit mode.

Figure 15:
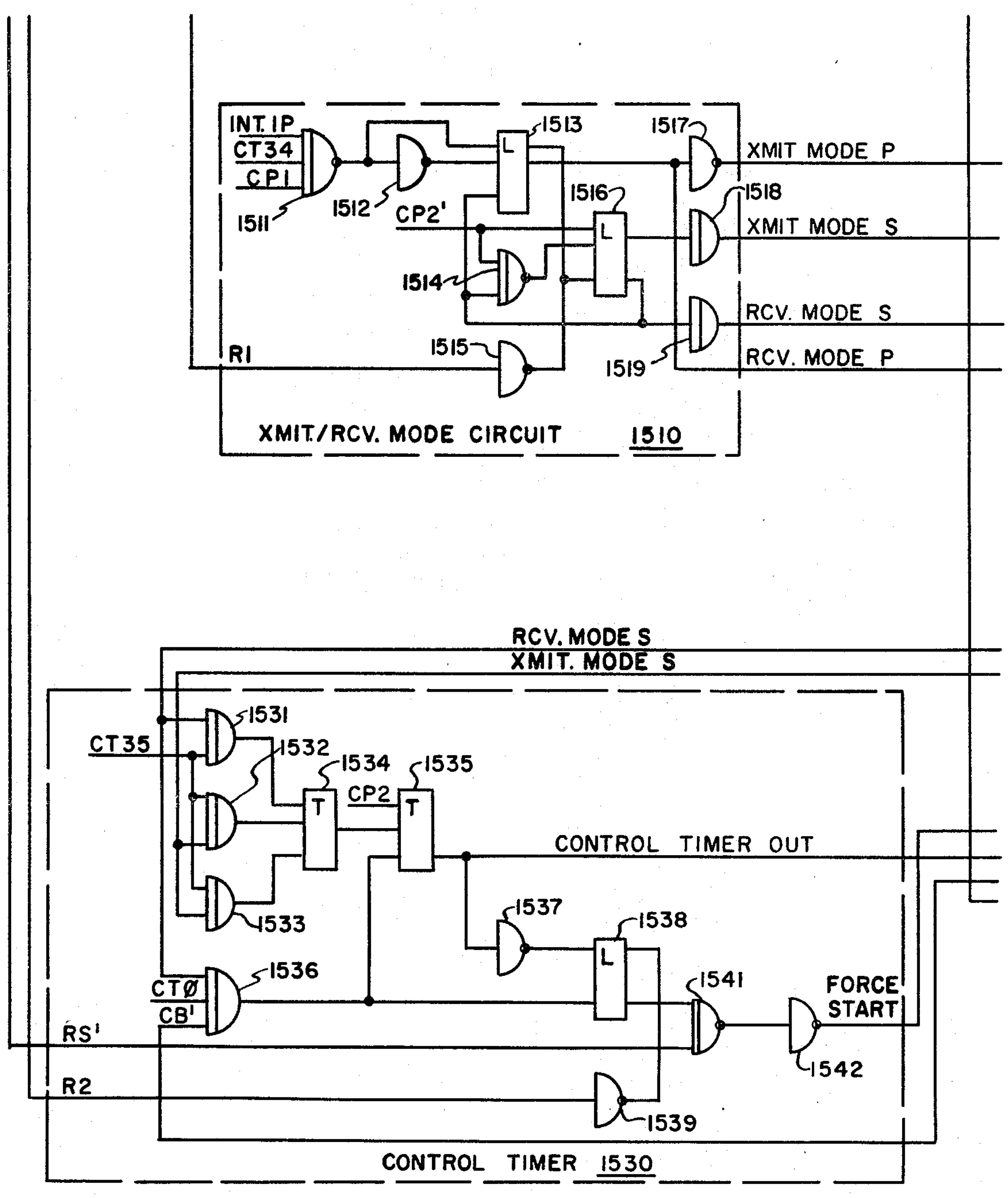

The control timer 1530 shown in FIG. 15 is composed of a timer and timer expander. The timer output is a function of CP2 for squelch operation. The receive mode S input is applied to gates 1531 and 1536 at the beginning of the receive mode as used to block the data receiving set long enough to allow transients to diminish. This period must end therefore before the remote station pretransmission mark is completed. The transmit mode S input to gate 1533 is enabled at the beginning of the transmit mode. The pretransmission mark period must be longer than the remote station squelch period.

Figure 12:
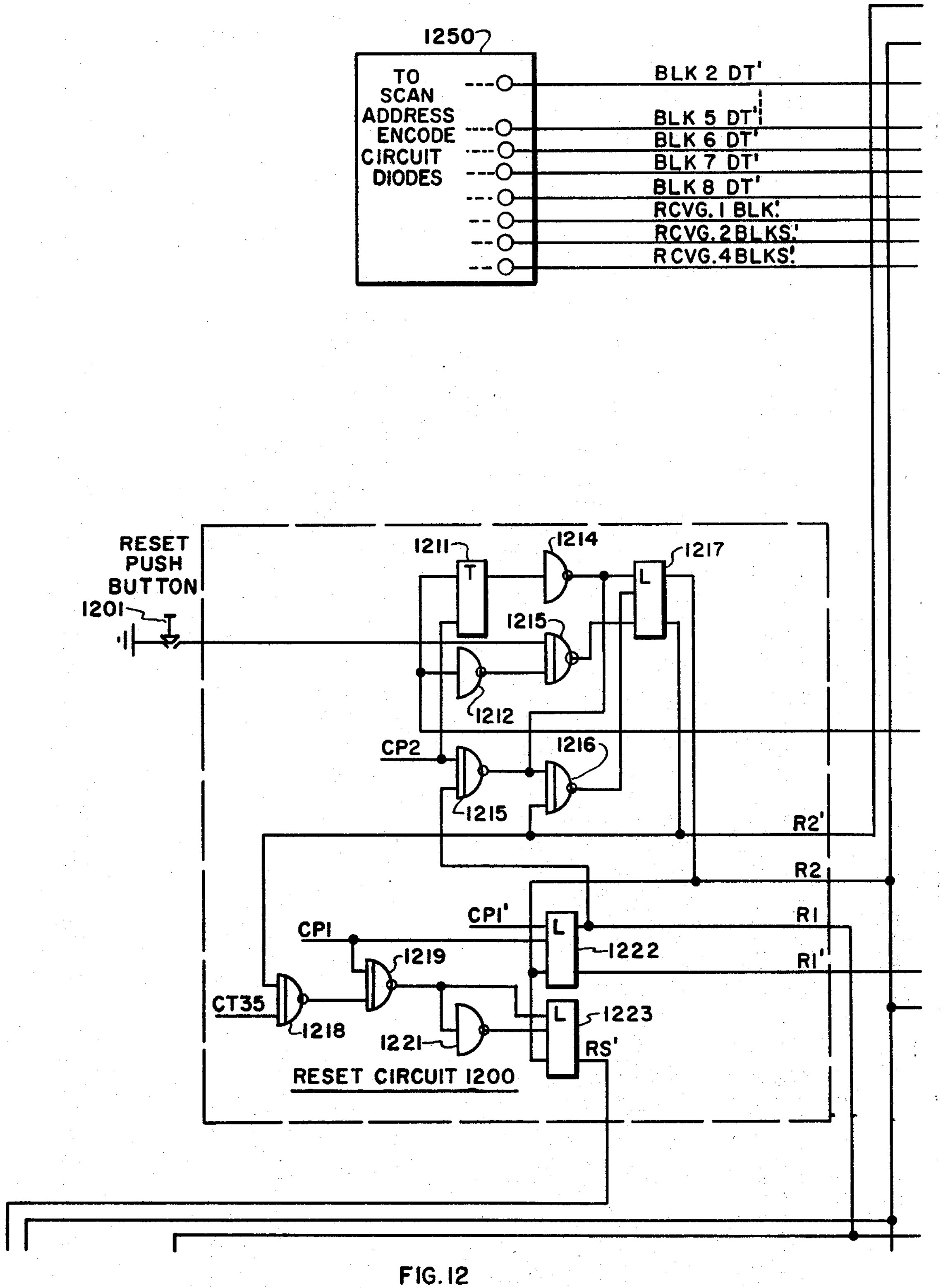
FIGS. 12–27 are to be arranged.

The reset circuit 1200 shown in FIG. 12 operates as a function of CP2 and the reset push button 1201. It is also operated in response to the master station failing to return to a count of CT0 or CT34 after one block period. This latter condition is a result of the function of transmission rate, and the timer ranges are thus adjusted to exceed one block length at each speed. The output of timer 1211 sets latch 1217, latch 1222 sets on the following CP1. Latch 1217 then resets on CP2 after the reset condition is removed with latch 1222 following on the next CP1. Latch 1223 sets when latch 1222 sets and is used to start the transmission clock by way of output RS′ through the control timer including gate 1541 and inverter 1542 to the force start output. Latch 1223 resets when the count of CT35 is reached. The outputs of latches 1222 and 1217 are used whenever a general reset signal is required in the master station.

The sequence counter 1610 shown in FIG. 16 advances on every CPB pulse on the first CP2 after a count of CT14 is reached, and during that period when interval 5S from the interval generator 1620 and a count of CT34 are present. The sequence counter 1610 is reset to the count of CT0 in response to the coincidence of the count of CT33, interval 2S and CP2 unless a last block receive signal has been derived from the last block receive circuit 1310 of FIG. 13. In which case the counter is allowed to advance from the count of CT33 to CT34 and then from CT34 to CT35. At this time the counter 1610 is then reset to a count of CT0 on the next clock pulse CP2 following receipt of an output pulse from the control timer 1530. The sequence counter 1610 provides a means of controlling the master station transmission sequence and is similar to the counter provided in the remote station binary counter. It is advanced or reset by clock pulses. The counter outputs are then decoded by conventional logic means to provide the various key counts of the sequence counter.

The interval generator 1620 also shown in FIG. 16 provides ten distinct intervals designated interval 1P through interval 5P and interval 1S through interval 5S. These are used as timing slots to perform logic functions within the master station control and the peripheral circuitry. The generator is a two stage three bit 2N counter, with the primary stage operating as a function of CP2. The intervals derived thereby are combined with CP1. The secondary intervals are a function of CP1 and may be combined with CP2.

The interval generator begins running on every CPA pulse and also the leading edge of count CT34. The R1 input is utilized as a general reset for the internal latch circuitry of the generator. The five internally generated intervals are effectively decoded by conventional logic means so that the intervals 1P through 5P represent the five primary intervals followed by the decoded intervals 1S through 5S which represent the secondary intervals. All of these intervals are utilized throughout the master station control circuitry.

Figure 13:
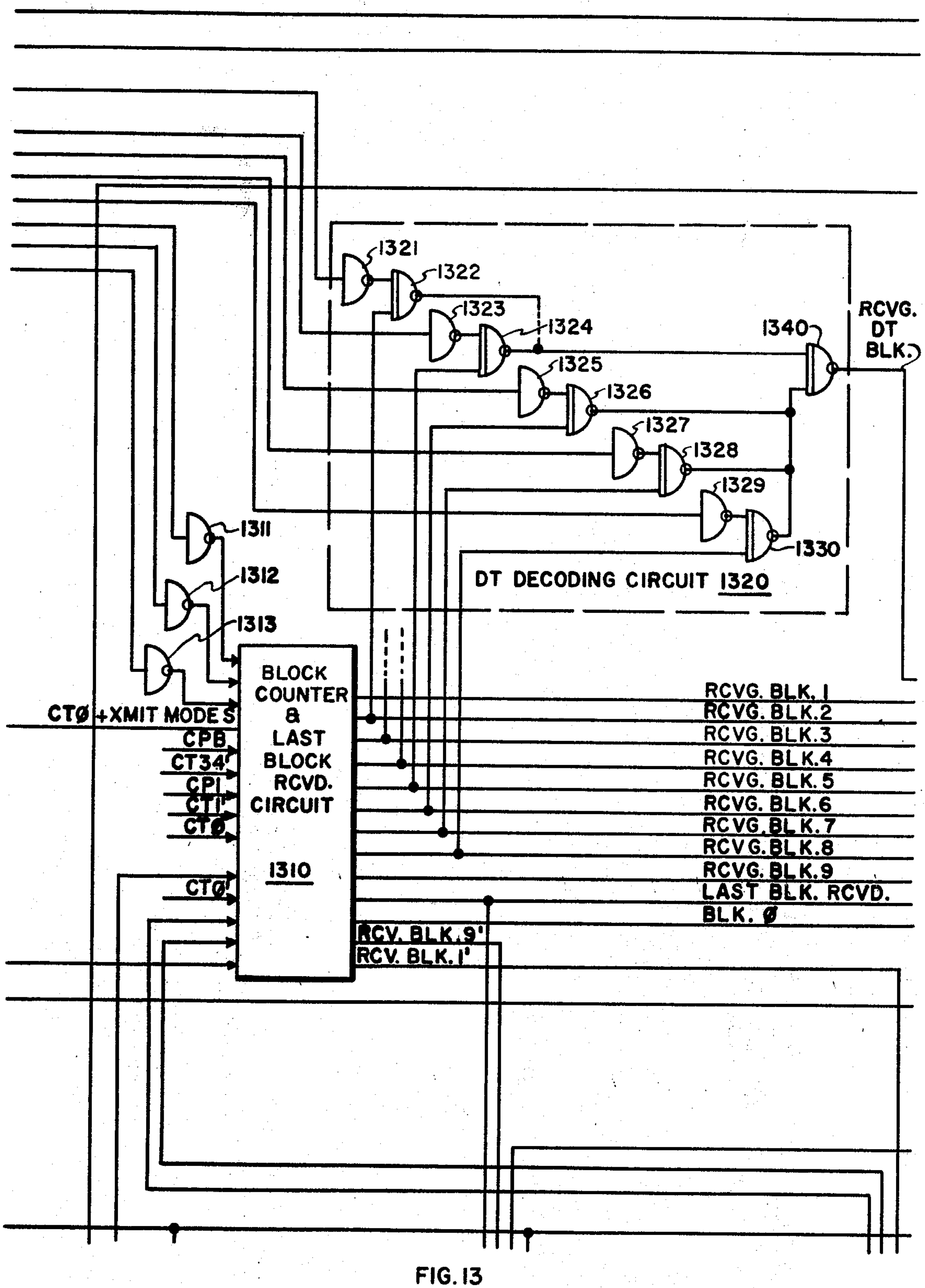

The block counter 1310 shown in FIG. 13 is a four bit binary counter which advances the clock pulse CPB at the beginning of a count of CT1 as each message block is received. It resets to a block ZERO state at the beginning of count CT34 or in response to the general station reset via lead R1′. The block counter remains in the block ZERO count throughout the transmit mode. Internal logic circuitry is utilized within the block decoder to decode the counts generated by the block counter to provide the necessary outputs derived therefrom for use throughout the master station control circuitry. Included within the block counter circuitry is a last block received circuit which compares the count indicated in the block counter with the blocks expected from a particular address reply. It also checks for the end of message bit after the last block expected is received. Its output the "last block output" goes to zero after the last block expected is received only if the end of message bit is a "mark." If that bit is a "space," it is checked after each succeeding block is received until a mark is found or eight blocks are received, whichever occurs first. If the address received is invalid, eight blocks are received regardless of the number of blocks expected.

The master error circuit 1740 provides common error detection for the master station. Certain errors may be particular to a peripheral circuit such as a double transmission error being peculiar to the scan address circuit error is detected and then combined with the common error detection. Common errors are address errors, checking code errors and A/B bit errors. The common errors combined with various peripheral errors develop a block error signal which is utilized throughout the master station. An address error will result in a block error for every block received afterwards. A block error during an interrogation will result in a re-interrogation of that address. If during the second interrogation, an error address, or a code checking error in the first block or A/B bit error results, a set common error output will be generated to set a communication error latch. If no communication error is detected a reset common error output is developed to reset the communication error latch assuming it had been set during a previous interrogation. The master error circuit comprises conventional logic circuitry.

Figure 14:
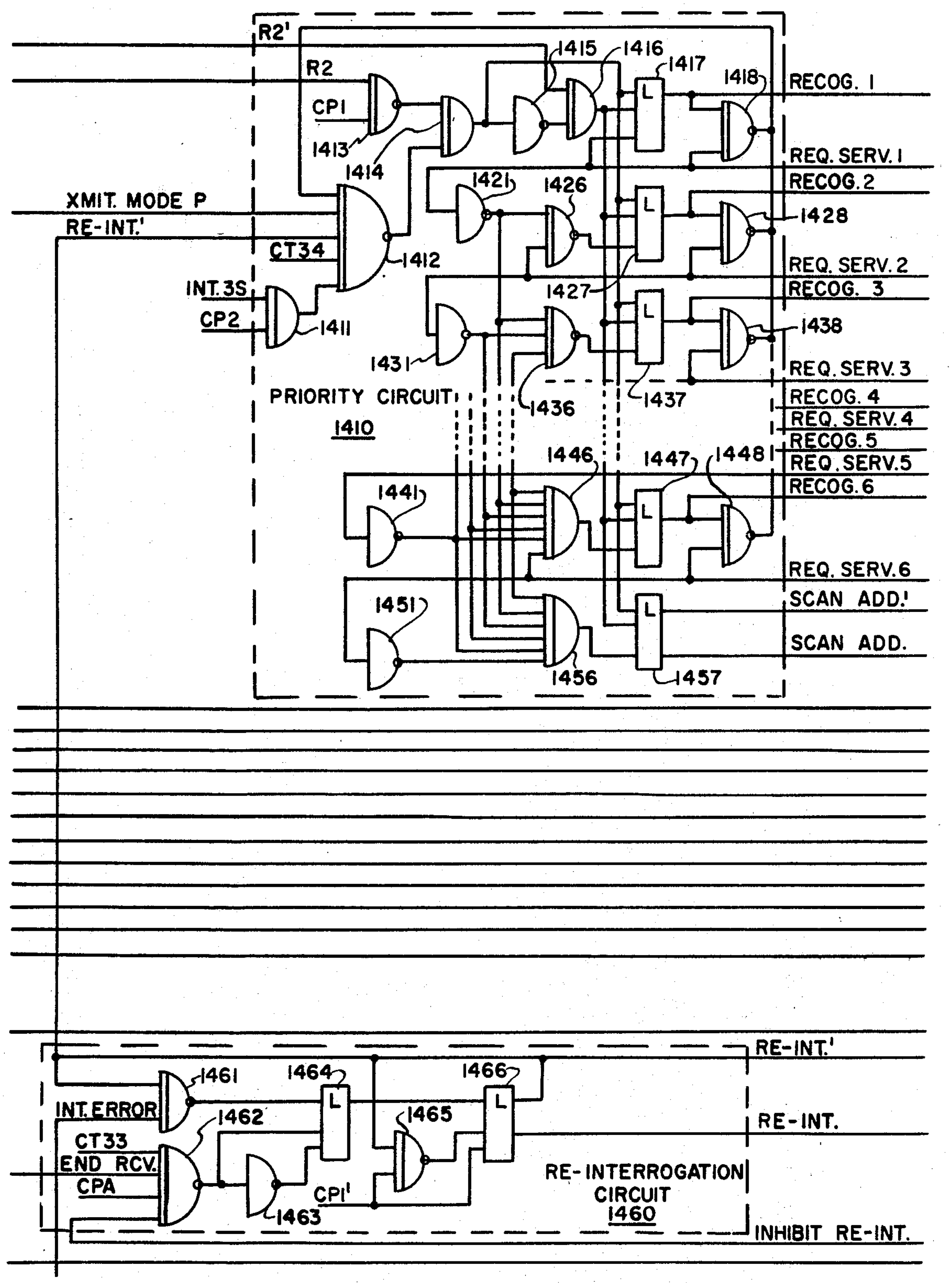

The re-interrogation circuit 1460 shown in FIG. 14 develops a re-interrogate command, if the first interrogation of an address results in an interrogation error. The circuit will reset after the second interrogation regardless of interrogation errors. In this way the master station is limited to one-re-interrogation (total of two interrogations) of a particular address. A peripheral circuit may prevent the interrogation circuit from initiating the re-interrogation of an address or for resetting after the second interrogation by grounding the inhibit re-interrogate prime input of the re-interrogate circuit.

The transmit/receive mode circuit 1510 shown in FIG. 15 changes state in response to coincidence of counts CT34, interval 1P and clock pulse CP1. Two sets of outputs are developed: TRANSMIT/RECEIVE MODE P which is a function of clock pulse CP1 and TRANSMIT/RECEIVE MODE S which is a function of clock pulse CP2. The mode outputs are utilized by the various peripheral circuitry associated with the master station.

The priority circuit 1410 shown in FIG. 14 contains seven priority levels to which the peripheral circuitry is assigned. The scan address circuitry is permanently assigned to the lowest priority or a priority of seven so that normal operation of the system is to continuously scan data addresses. All other peripheral circuitry requests service by placing a "one" on its assigned request service priority input. The service is then recognized when the corresponding recognize priority output goes to a one state. A peripheral circuit may hold priority after recognition by continuously requesting service. A new priority level is recognized only after the existing service request is removed in coincidence of TRANSMIT MODE P, RE-INTERROGATE CT34, interval 3S and clock pulse CP2 are present. A peripheral circuit request coincidence of inputs. In the present system it should be noted that the only priorities utilized are that of the scan address priority (priority 7), priority 6 and priority 5. Depending on the particular requirements of a system, additional priorities may be required.

Figure 20:
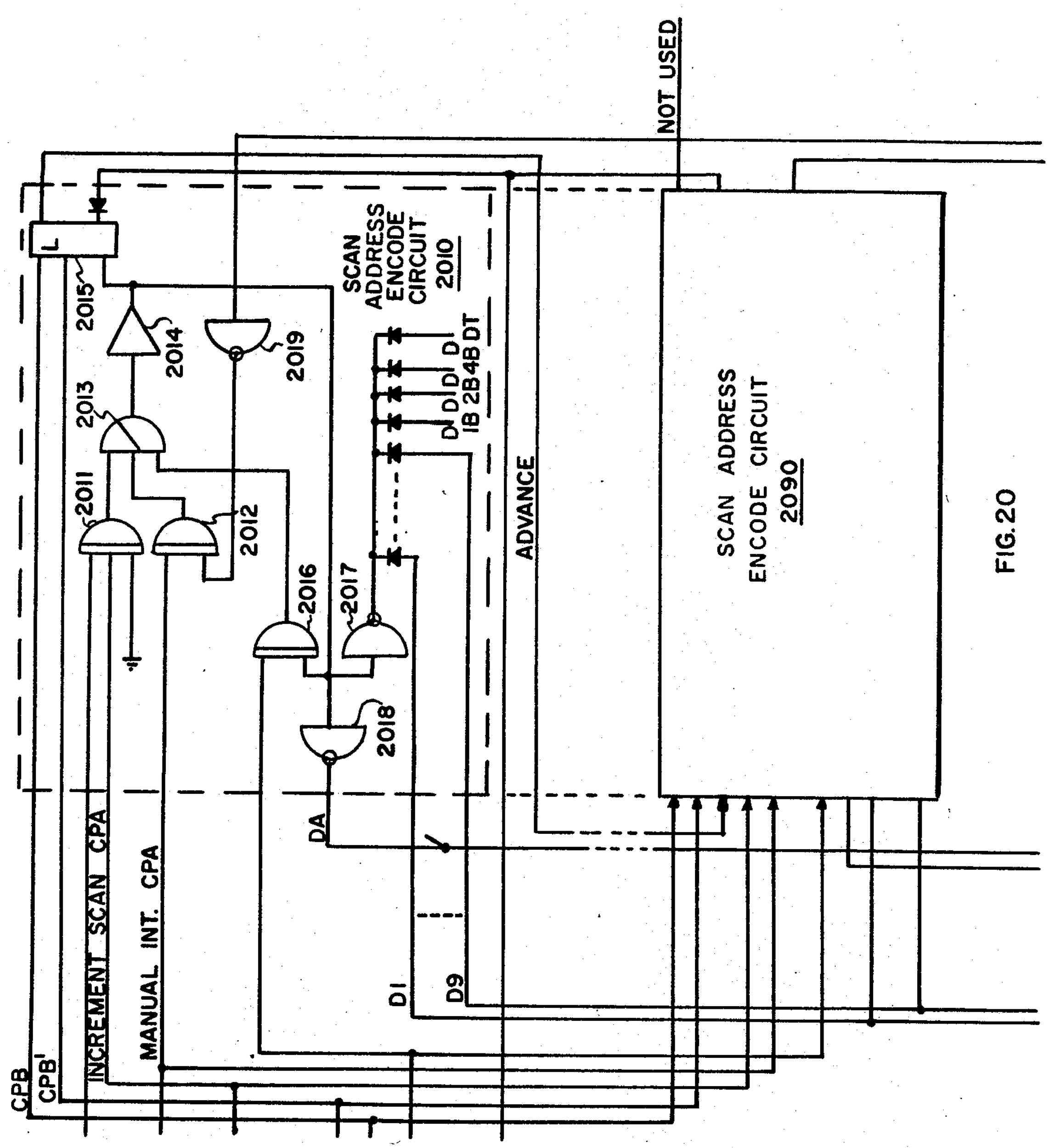

FIG. 13 combines the block count with double transmission information provided by the address encoding cards of FIG. 20 so that the receiving double transmission block output becomes true when a double transmission block is being received. It is noted that the terminal block 1250 shown in FIG. 12 serve as connecting points for diodes connected to the scan address circuits of FIG. 20. Addresses that involve double transmission techniques are identified by this strapping.

The code security checking circuit 1640 shown in FIG. 16 contains a register for receipt of the Bose-Chaudhuri encoded checking information utilized in the present system as well as the associated control circuitry. In this circuit five check bits are encoded or decoded as a function of a five bit shift register and two "exclusive OR" gates. The error check will be satisfactory if the shift register is set to an all zero state after receiving a complete block. The register is then reset at the count of CT0 and the next clock pulse CPA. The register primary is loaded on clock pulse CPA and the secondary shifted on clock pulse CPB when in the transmit mode, or on clock pulse CP1 when in the receive mode. When in the transmit mode the "exclusive OR" circuits are disabled while the check bits are being transmitted.

Figure 17:
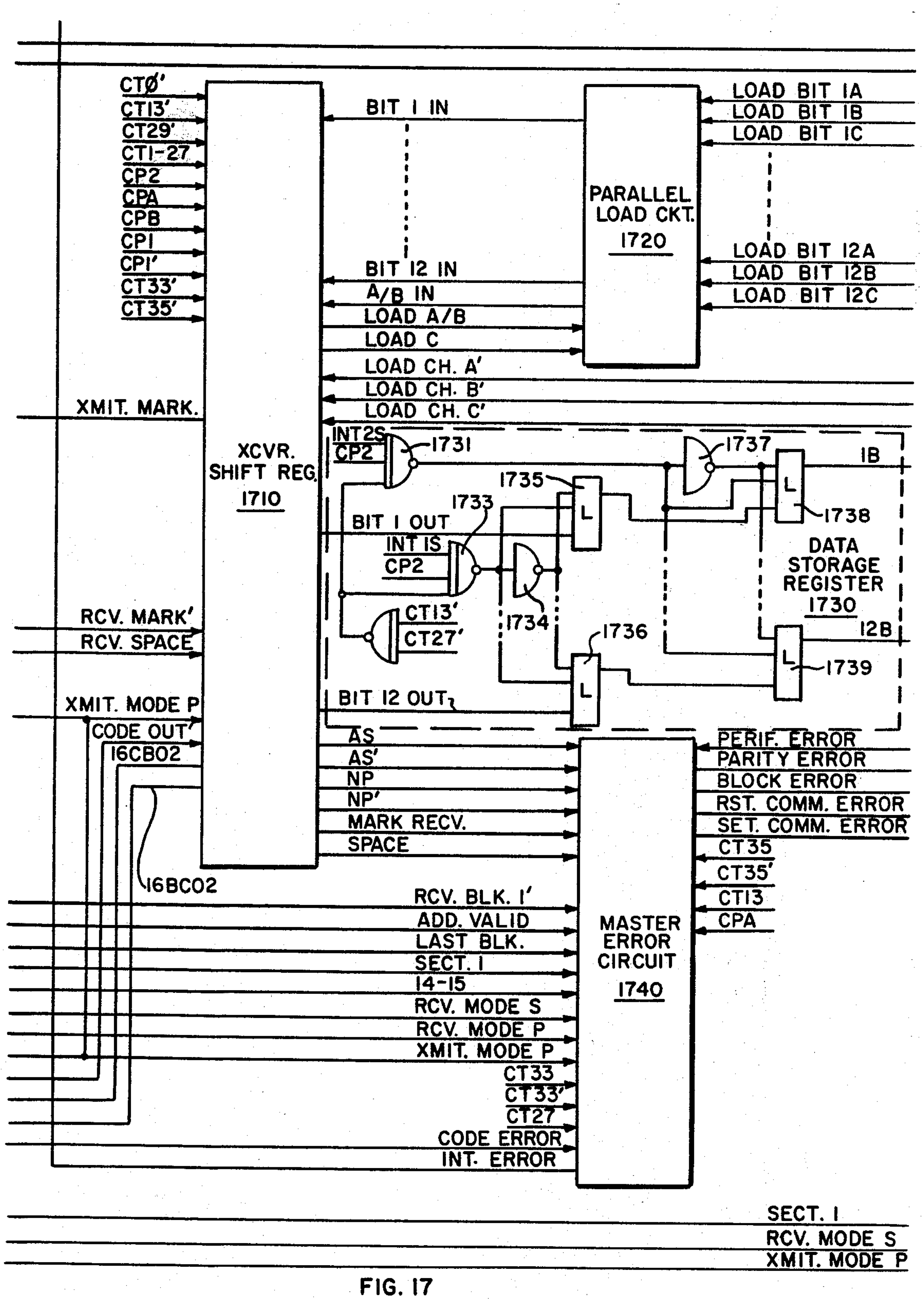

The transceiver shift register 1710 and its associated parallel load circuit 1720 are disclosed in FIG. 17. They are of conventional design with the parallel load circuit providing a three channel twelve bit parallel input to the transceiver shift register. The channels comprise a diode receiver input and two standard logic inputs. The diode receiver input however contains diode receiver gates for bits 1 to 9 only. Bits 10 to 12 are standard logic input gates.

The transceiver shift register itself is a thirteen bit parallel load, parallel dump serial shift register of conventional design. The first bit to be transmitted is designated bit 12. The last bit in each thirteen bit section is the A or B housekeeping bit. Received data is shifted into the shift register one bit at a time. The received section fills the shift register and is then dumped in parallel to the data storage register 1730 shown in FIG. 17.

The serial input to the transceiver shift register is via the lead designated "receive space" and the serial output is via the lead designated "parallel" loaded.

On coincidence of a count of CT0 or CT13 or CT29 and interval 5S and clock pulse CP2, whenever a peripheral circuit places a "zero" one one of the load channel inputs the register is loaded. The primary of the shift register shifts on clock pulse CPA and the secondary on CPB.

The data storage register 1730 shown in FIG. 17 is loaded from the transceiver shift register as each thirteen bit section is received. The information is initially dumped via leads BIT 1 OUT through BIT 12 OUT (and intermediate leads not shown) into the first registers consisting of a group from 1735 through 1736 and then further loaded from the first latches into the second series of latches typified by latch 1738 through 1739 just before new data is received from the shift register. After a complete block has been received the output registers 1738 through 1739 contain the first section of the block and the preceding registers the second section. The parallel output of the registers 1738 through 1739 feeds the data highway drivers so that information on the highway is one block behind the block being received and remains on the highway for duration of one section of the message.

The data set 1650 as shown in FIG. 16 is similar to that utilized in the remote station and provides a means to transmit and receive data serving as the interface with the communication link. As noted in connection with the remote station the data set as used in the present system is Automatic Electric Model 2024CL for use in tone signaling systems. The previous discussion of the data set in connection with the remote station holds true for the data set at the master station.

SCAN ADDRESS CIRCUIT

Figure 18:
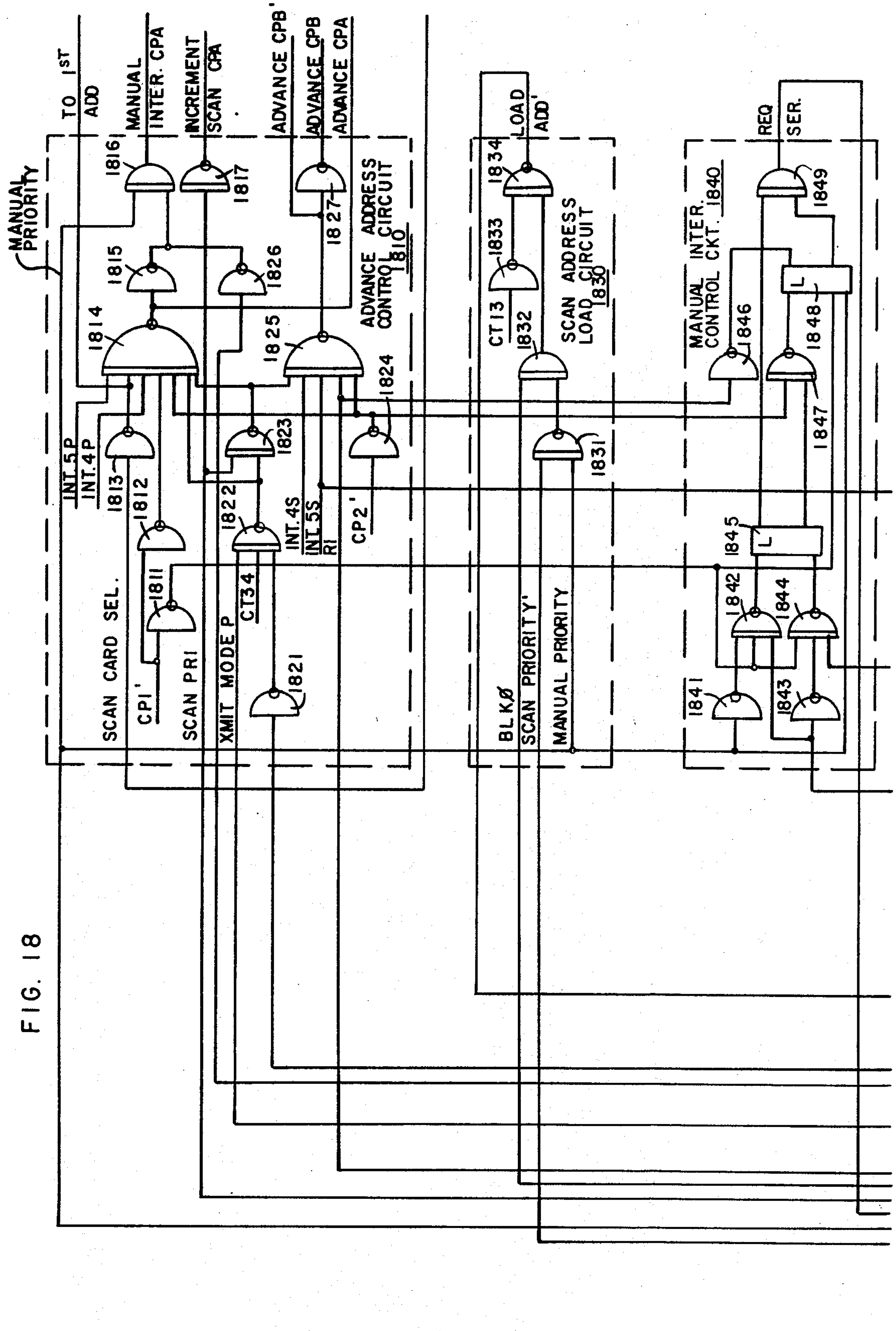
Figure 19:
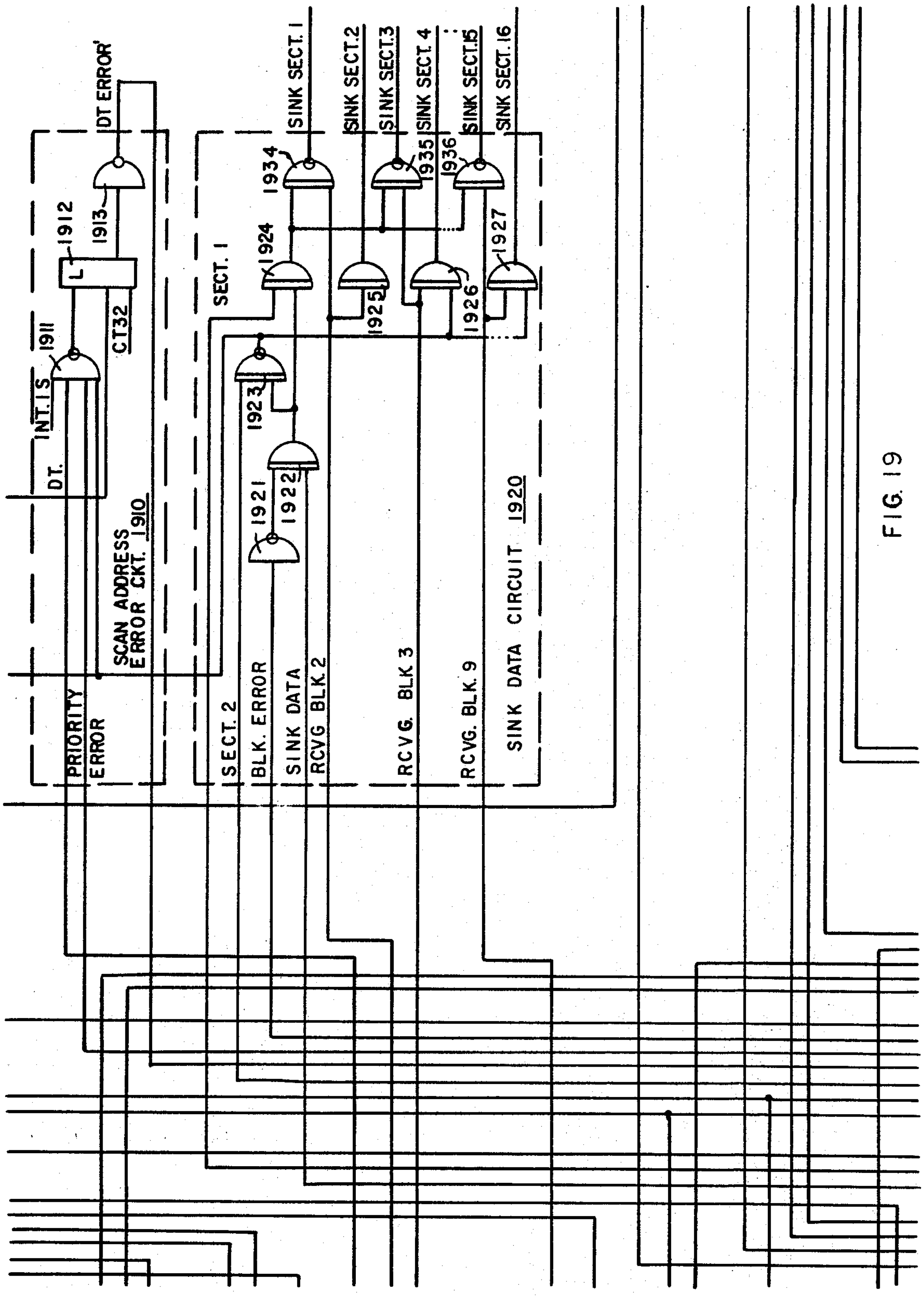

Referring now to FIGS. 18, 19 and 20 which disclose the scan address circuit and its associated scan address encoding circuit. Addressing in the present system is performed on a per-reply-basis rather than on a per-point basis. Each address when used to scan points in the system, has the ability to cause the remote station to initiate a reply message which may contain up to eight message blocks. Thus a reply message in response to a single scan address can return up to 180 field indications either status or alarm, or 15 digitized analog signals.

The scan address circuit contains the necessary logic circuitry to generate encoded three digit scan addresses sequentially for points to be scanned, cause a normal scan advance, and while not disclosed herein may be equipped to cause jumps in the normal scan sequence, and cause as many as two re-interrogations in response to receipt of a message block or blocks received as invalid on a first interrogation. The scan address further includes the necessary logic circuitry to develop a data sinking pulse which the display storage unit circuits may act upon.

The address encoders consisting of a group numbered 2010 through 2090 disclosed in FIG. 20 make it possible to store information unique to a single address such as the address itself, the number of blocks of information to be received and which blocks contain double transmitted data. It would also be possible, although not shown in the present system, to include line switching instructions and transmission rate instructions. The scan address circuitry is designed to recycle each time a system scan is completed. Also included in the scan address circuitry are provisions for manual interrogation whereby the normal scan may be interrogated upon demand.

The individual circuits of the scan address circuit include the following:

The Advance Address Control Circuit 1810 disclosed in FIG. 18 causes advancement of addresses in the scan sequence by setting latches in sequence on succeeding address encode cards. The pulses produced by the advance address control circuit are referred to as advance CPA and advance CPB. The advance CPA pulse will reset the first latch in a previous scan address encode circuit and set the first latch of the next succeeding encode circuit. The advance CPB pulse will reset the second latch in the previous address encode circuit and then set the second latch of the following circuit. The choise of the succeeding address encode circuit is determined by the occurrence of one of two other pulses. These are a pulse identified as increment scan CPA or manual interrogate CPA, each of these are a function of the advance CPA pulse. It should be further noted that while not specifically shown a jump scan CPA pulse could be developed in similar manner.

The normal scan routine is achieved by advancing from one scan address encode circuit to the next on a sequential basis. In this arrangement the second latch of each card will enable the first latch of the immediately succeeding card so that upon receipt of an increment scan CPA pulse the first latch of the succeeding card will set. Reference to FIG. 20 will note the advance lead that extends from the latch 2015 to the succeeding card where it enters in place of the pulse indicated as "to first address," into a gate corresponding to gate 2011 where with upon receipt of the increment scan CPA pulse the first latch will be set. The second latch of course will set upon receipt of the advance CPB pulse thus enabling the input of the following card. This arrangement is continued until when the last address encoding card is reached the increment scan CPA pulse will not set a latch on any card. The fact that no latch is set enables the input to the first card and thus will cause another increment scan CPA pulse to be issued. The upper output from the latch in the last circuit is not used as indicated in FIG. 20. An increment scan CPA pulse will occur whenever an advance CPA pulse is issued, when the station is in scan priority.

The Manual Interrogate CPA pulse is issued instead of an increment CPA pulse whenever the station is in the manual interrogate priority. The first latch on the address encode card selected for manual interrogation is set by this pulse. When the remote station is in manual priority no advance CPB pulse will be issued leaving the second latch of the previous address encode circuit on set. Upon completion of the manual interrogation, the normal scan will resume from the previous normal scan address.

The Manual Interrogation control circuit 1840 disclosed in FIG. 18 requests service from the priority circuit of FIG. 14. An input is applied to inverter 1843 and subsequently gate 1844, when the operator operates a manual interrogate key such as 2731 shown in FIG. 27. When priority is recognized by the priority circuit in response to application of a pulse on the recognize six lead of the priority circuit, it is conducted to gate 1842 through inverter 1841, the request service signal will be removed. Return of the recognize manual priority signal from the priority circuit is utilized by the advance address control circuit referred to above in a manner previously described.

The Sink Data circuit 1920 disclosed in FIG. 19 provides a signal to sink each data section. This is generated when that data section is present on the data highway, if the block containing the section had been received without error. The sink section signals 1 through 16 are present one block after the particular section was received, that is to say that section two was received during the second section of block one but sink section two is a function of the second section of block two.

The Scan Address Load circuit 1830 shown in FIG. 18 generates signals to load addresses from the scan address circuitry into the transceiver shift register of FIG. 17. These signals are generated with the address section or information for the second section of an address block. Normally no information is loaded into the second section of an address block. However, the signal to load the second section and the signal to gate the information are made available by this circuit.

The scan address error circuit 1910 shown in FIG. 19 will generate an error signal if any bit of the second section of a double transmission block does not compare with the corresponding bit of the first section. This error circuit is transmitted to the master error circuit of FIG. 17 where it is received as a peripheral error.

The Scan Address Encode circuits represented by the groups 2010 through 2090 shown in FIG. 20 effectively represent the entire group and may be distributed over one or more remote stations. As discussed previously in response to receipt of pulses from the advance address control circuit 1810 they will provide an encoded address that will be loaded into the parallel load circuit associated with the transceiver shift register of FIG. 17. This three digit address utilized in an octal code is achieved by installing appropriate diodes such as D1 and D9 and marking as true the appropriate busses on an octal coded basis. In addition the scan address encode circuit is used to develop marks to indicate the number of blocks of data to be received for utilization by the block counter of FIG. 13. This is accomplished by including one of the diodes such as D1B, D2B or D4B and connecting it to the receive 1, 2 or 4 block gate inputs of the block counter depending upon the appropriate number of blocks to be received. In addition a marking indicating double transmission technique associated with a particular address can be provided from this circuit by means of a diode such as DDT connected to the appropriate input of the double transmission decode and address card of FIG. 13.

SECTION DISTRIBUTOR

Figure 21:
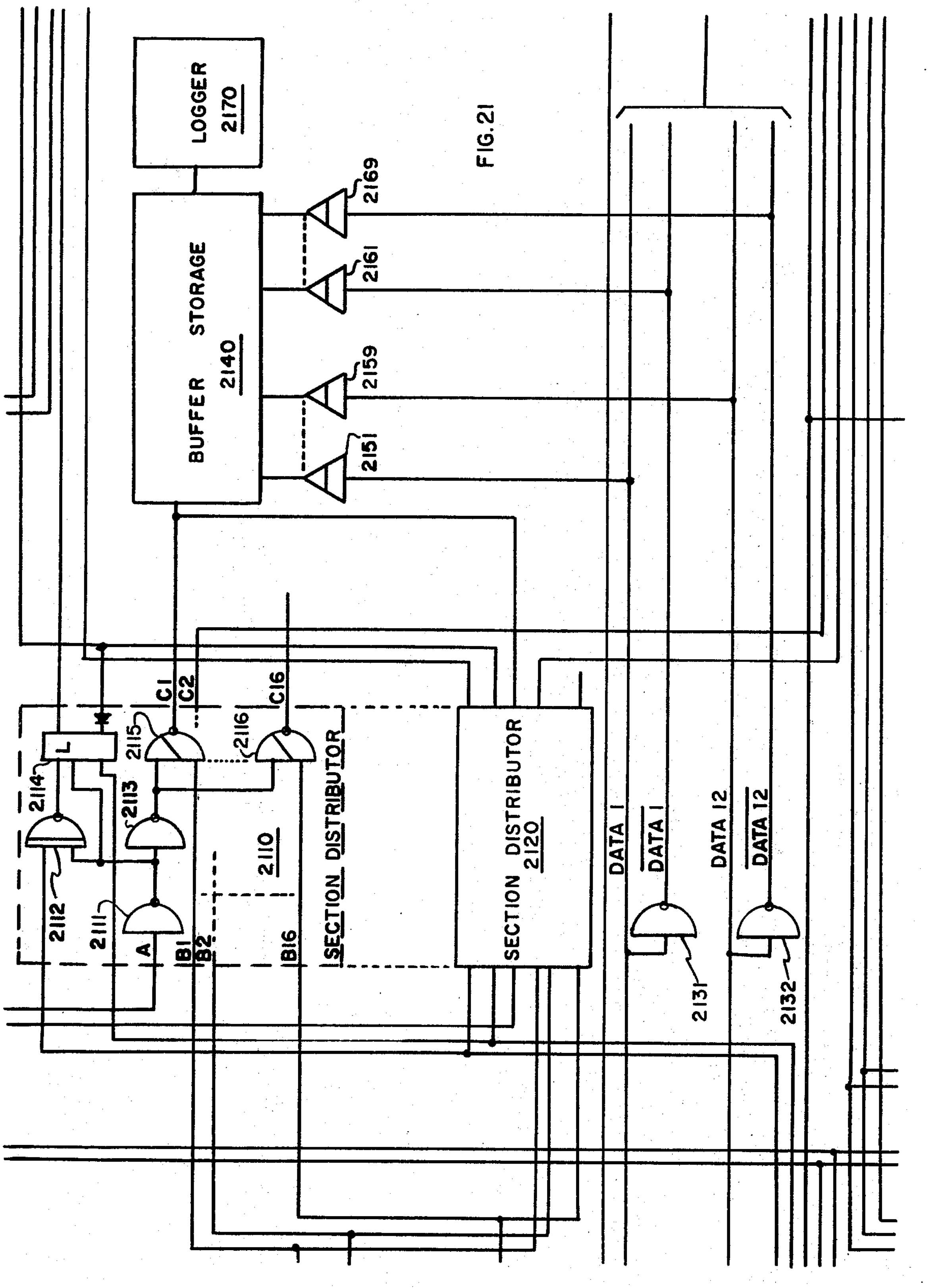

The Section Distributor such as 2110 shown in FIG. 21 is provided for each remote office to be served. The section distributor acts to control sinking of data received over the data highways indicated as Data 1 to Data 12, and Data 1' to Data 12' of FIG. 21 to the appropriate data sink or data informational storage device. In combination with receipt of information as to which section data is to be sinked in, such as sink section 1, 2, etc., from the sink data circuit 1920 of FIG. 19, and the receipt of an output from the scan address circuit then being scanned, the section distributor produces outputs from C1 to C16.

In the present system only two forms of data sink have been indicated. One of these is a device such as logger 2170 which may be such device as a strip chart recorder, electric typewriter, tape recorder, etc. accessed by buffer storage 2140 which may be any conventional form of digital storage. Information derived from the data highways is applied through electromechanical drivers such as 2151 through 2159 and 2161 through 2169 to the buffer storage and in response to receipt of a pulse from the C1 output of a section distributor will then extend the information stored therein to the logger 2170. The section distributor also includes circuitry for indicating the presence of a communication error, wherein response to receipt of signals derived from the master error circuit of FIG. 17 such as 2114 may be set to extend the signal to light an error lamp for the appropriate office in the panel equipment of FIG. 27.

Figure 26:
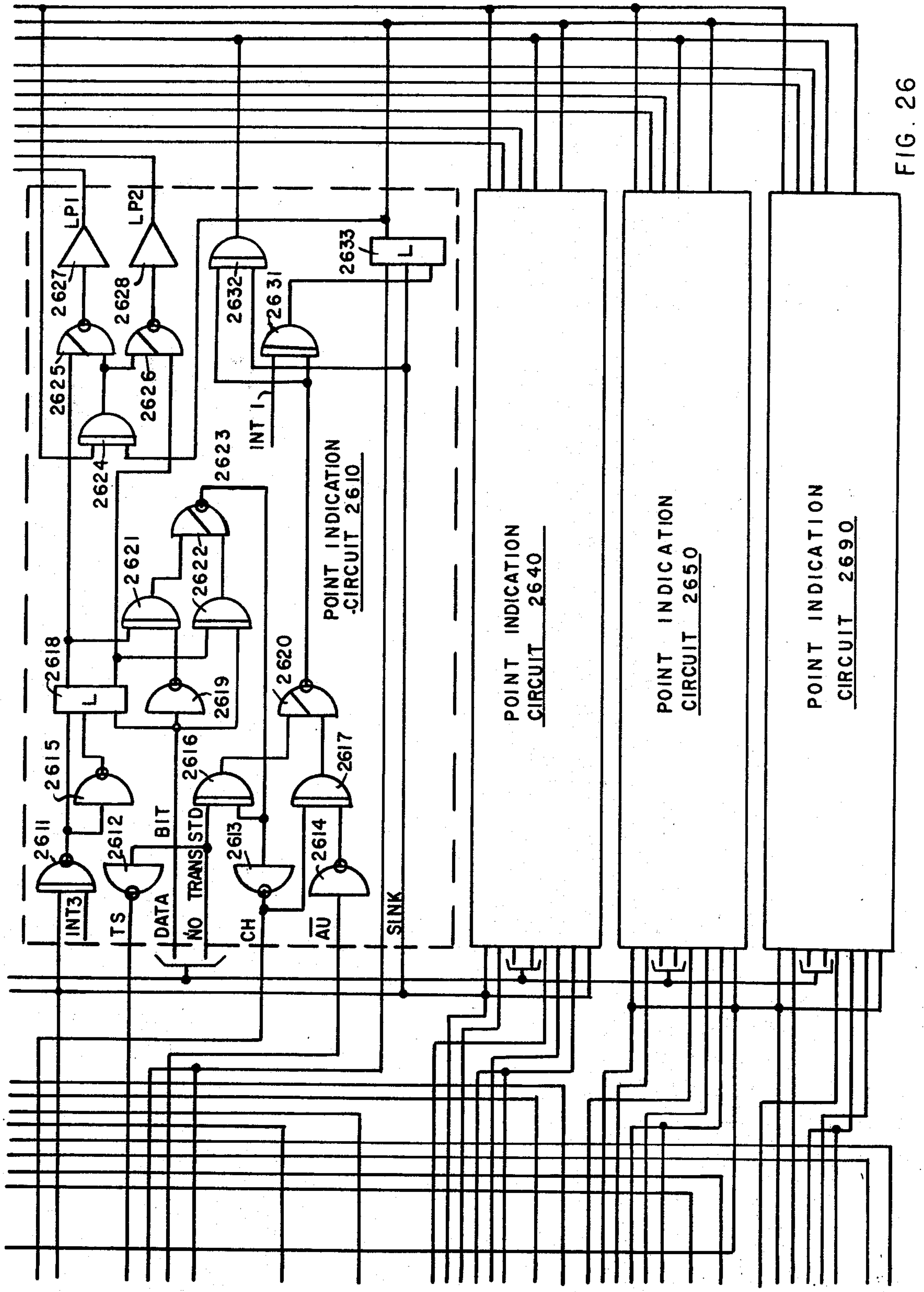

As noted before two forms of data sinking are disclosed in the present system. The second form is that of the indication of a control point as to its "on," "off" or similar state. This is accomplished in response to a sink section 2 input which will cause application of the C2 pulse to the point indication circuits of FIG. 26. Informational inputs to the point indication circuits of FIG. 26 are derived directly from the data highways, and not through the use of relay drivers such as were employed in connection with the logger described above.

CONTROL ADDRESS CIRCUIT

Figure 22:
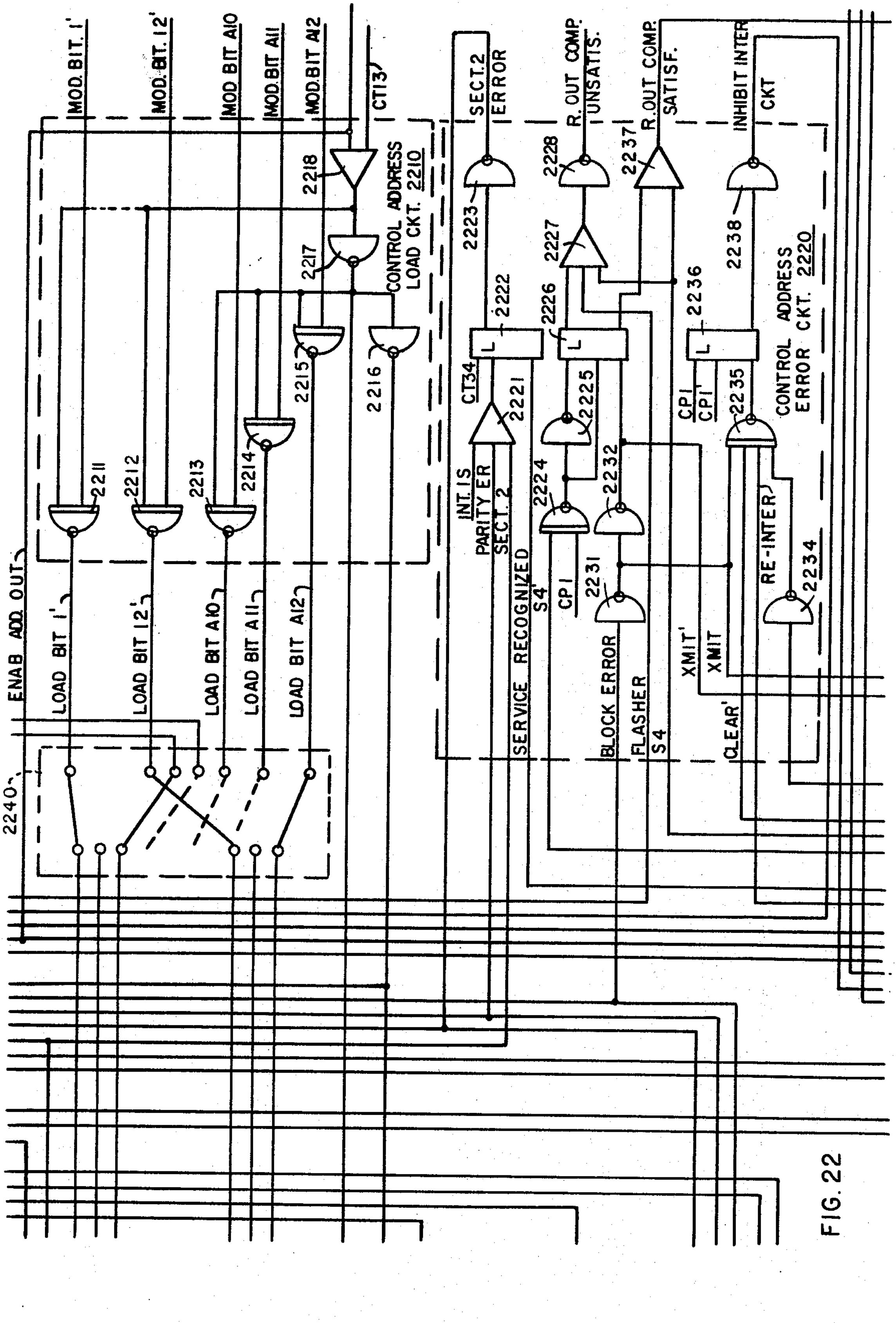
Figure 23:
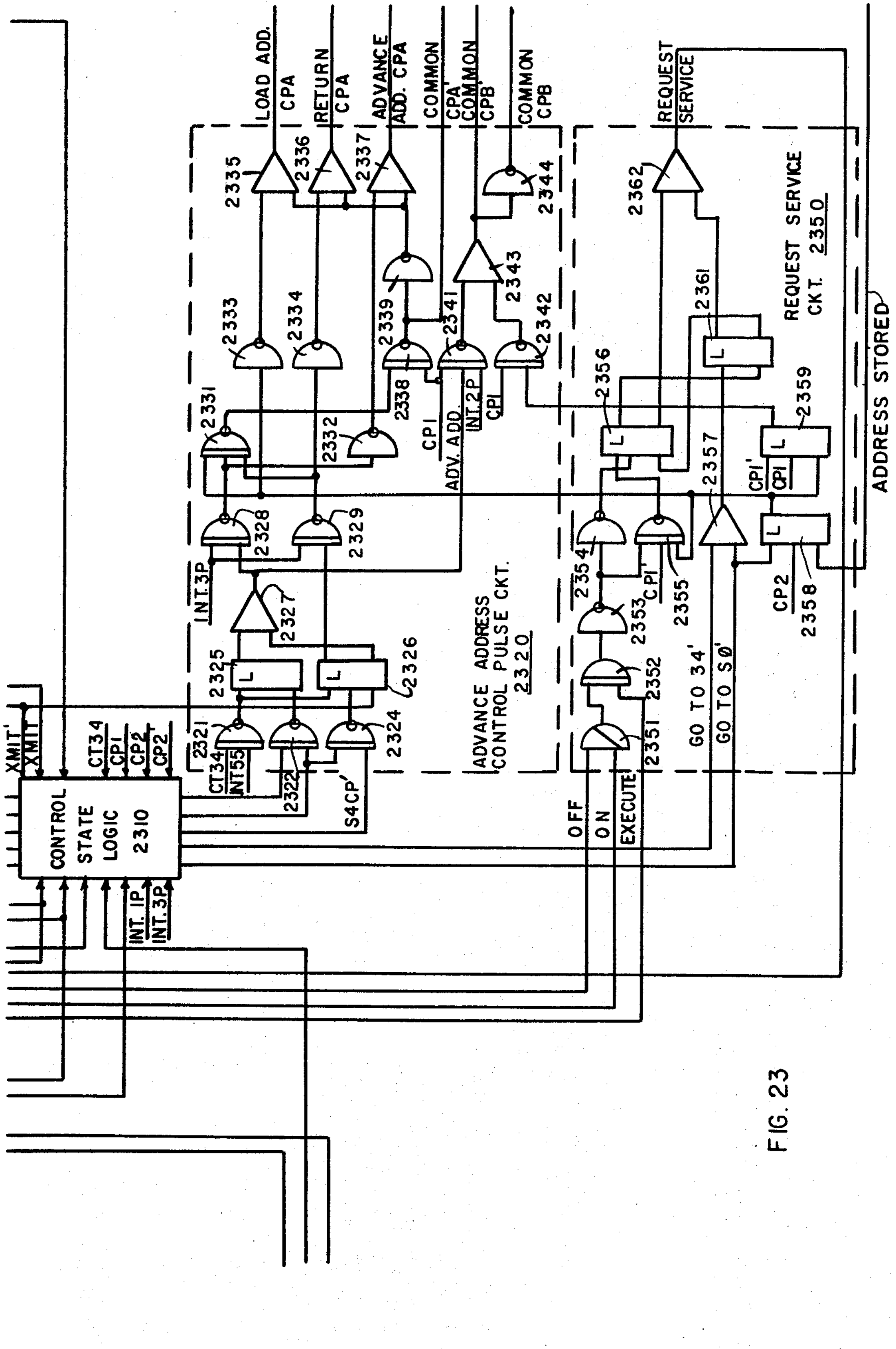
Figure 24:
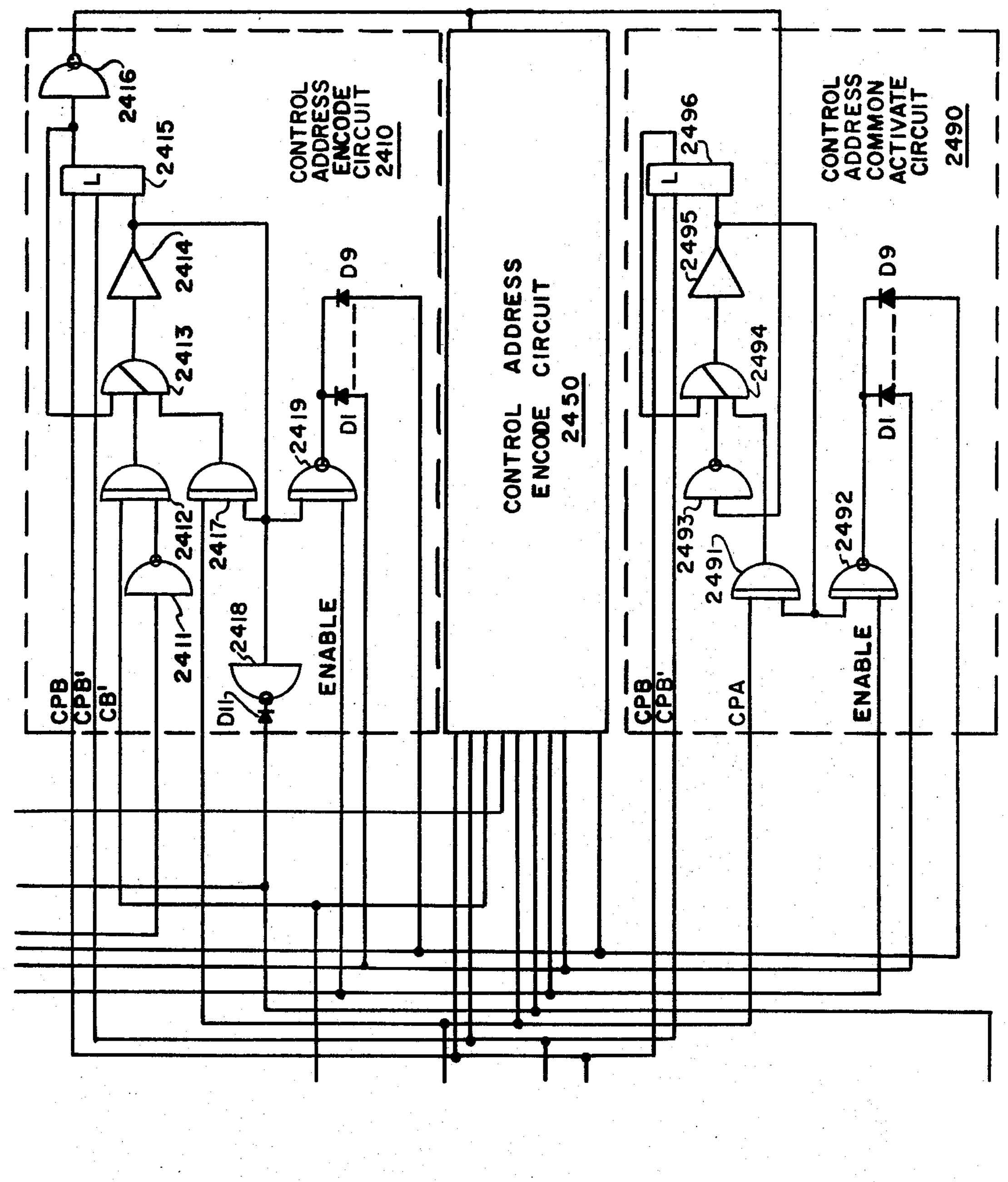

The Control Address circuitry disclosed in FIGS. 22, 23 and 24 is concerned with the generating of control messages and sequencing of the control routine. An encoded message is stored immediately pending an opportunity for the scan cycle to be conveniently interrupted. If a first attempt at control initiated by an operator is unsuccessful, the circuit will initiate a second and even a third control attempt. In a manner similar to that discussed in connection with the scan address circuitry previously, the control address circuit can store information unique to the particular control address generated. The control address circuit may be used to develop a three or four digit modifier for use in connection with set-point control (although not disclosed herein), in a manner similar to that discussed in connection with individual point control.

The Control Address circuitry is also utilized to develop a check-before-operate sequence routine and to indicate the satisfactory or unsatisfactory completion of the control routine. The control address encode circuits such as 2410 through 2450 shown in FIG. 24 are provided on the basis of one circuit to generate an address for each device to be controlled throughout the system.

The Request Service circuit 2350 shown in FIG. 23 provides a request service output to the priority circuit of FIG. 14. In this particular system as disclosed the input utilized is request service 5 at the priority circuit, indicating that of the functions described in the present system the control mode of operaton has priority over both manual interrogation of A scan point, and the normal scan operation.

Latches 2356 and 2361 are both in their set condition when the request service circuit 2350 is in this idle state. In response to coincidence of either an "off" or "on" input and an execute signal applied to gate 2352, latch 2356 will reset causing the output of the circuit from driver 2362 to go to a ONE or "true" state. When the control routine is completed latch B will be reset in response to application of the GO to 34' and GO to S0' signals to driver 2357. This will cause the output of the request service circuit to return to ZERO or the "false" state. The removal of the zero signal from the EXECUTE' input will allow the latch 2356 to set, again followed by the setting of latch 2361. If the zero state at the EXECUTE' input had been removed before latch 2361 reset, latch 2356 would set immediately after latch 2361 reset and thus latch 2361 would then again set. Normally the pulses produced by the advance address control circuit 2320 run continuously until an address code circuit has been selected. At this time by virtue of latches 2358 and 2359 the pulses may be turned off holding the address selected and inhibiting the selection of another address. When the routine has been completed as evidenced by a GO to S0' signal the latches 2358 and 2359 will again permit the transmission of pulses by the advance address control circuit.

The Control State Logic 2310 is a conventional coincidence gated logic arrangement which provides signals to set and reset the circuitry of the advance address control circuit and the control address error circuit 220 during the control routine. The control routine consists of a check-before-operate sequence, in which the control command address and modifier are transmitted to a remote station and then received back at the master station. The received message is checked against the transmitted message and if found correct an activate address is transmitted to the remote station. The remote station then returns the activate address to the master station. The received message is again checked against the transmitted message and if found correct the routine is complete. If at any point during the routine, an error is detected the routine is repeated. If during the second attempt an error is again detected, a routine complete unsatisfactory signal is issued.

The Control Advance Address pulse circuit 2320 is disclosed in FIG. 23. It is used to generate pulses such as common CPA and common CPB. Common CPA is used to generate one of the three pulses, Load Address CPA, Advance Address CPA and Return CPA. The CPA pulse sets or resets the first latch on the desired control address encode circuit. The CPB pulse is utilized to operate the second latch in the control address encode circuitry. In this manner address selection and advancement is achieved by the setting of latches from pulses derived from the control advance address pulse circuit, in sequence on succeeding encoding circuits. As noted previously these pulses are produced continuously unless inhibited by the request service circuit 2350. The load address CPA pulse runs continuously until an address card has been selected, holding the address selection and inhibiting the selection of another address. The advance address CPA pulse occurs when advancing from the control command address to the common activate address circuit 2490 of FIG. 24.

The Control Address Error circuit 2220 shown in FIG. 22 generates an error signal if any bit of the modifier section as received from the remote station does not compare with the corresponding bits which have been transmitted to the remote station. The error circuit also generates one of two signals when the control routine has been completed, indicating whether the routine has been completed satisfactorily or unsatisfactorily. The signal remains present during the presence of the S4 signal. The routine completed unsatisfactory output is utilized to cause the selection lamps such as 2713 in the panel equipment of FIG. 27 to flash indicating the presence of an error. The control address error circuit also develops an inhibit interrogation circuit output to inhibit the interrogation counter when advancing addresses after a valid message is received.

Figure 27:
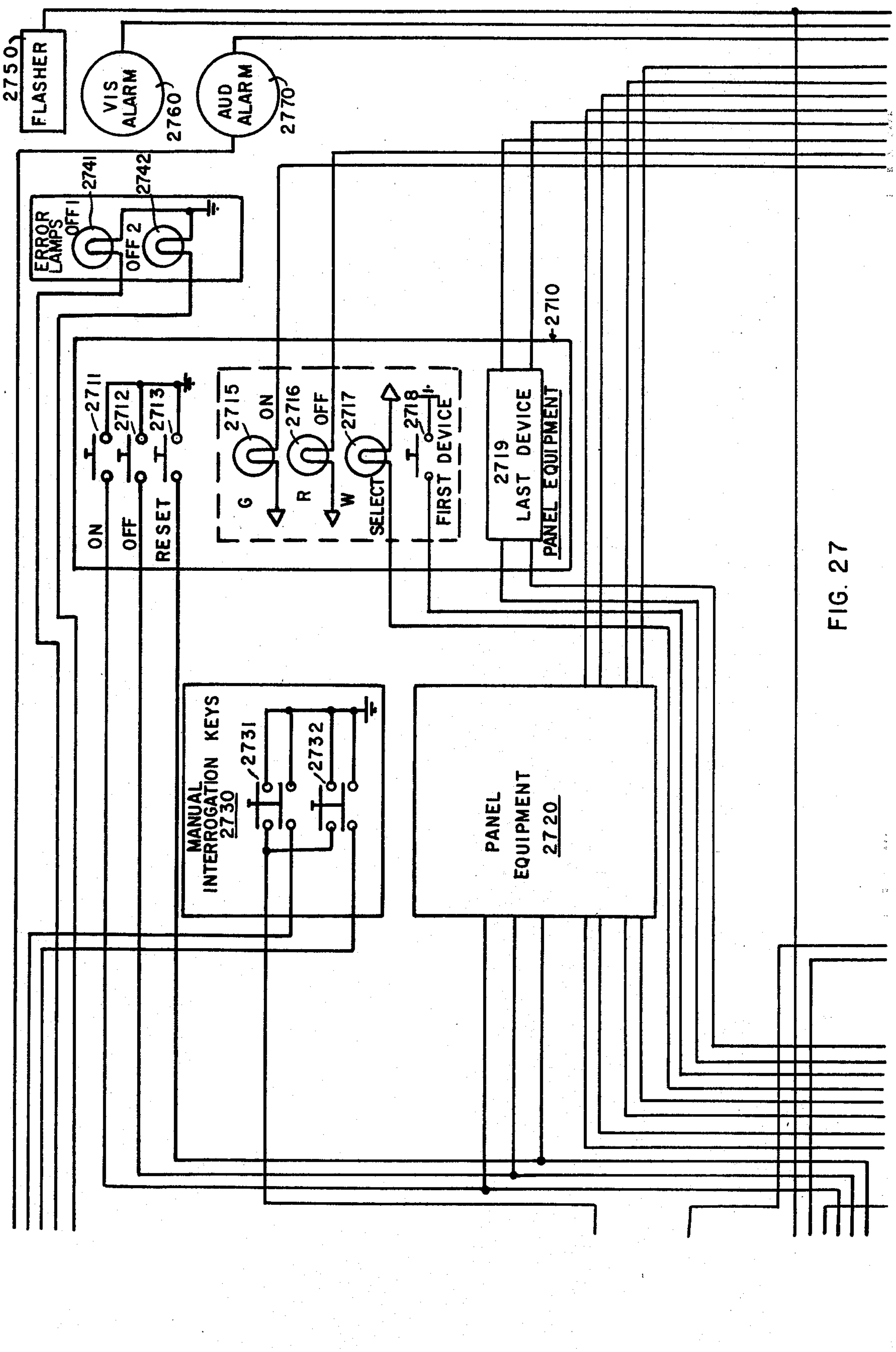

The Control Address Load circuit gates the modifier bits from the point selection circuits 2510 through 2590 inclusive as well as those generated by the "on" and "off" and "reset" keys included in the panel equipment shown in FIG. 27. This gating is in response to the receipt of an enabled signal derived from the recognition of the control priority from the priority circuit of FIG. 14, at the input of AND driver 2218.

As indicated the Control Address Encode circuits shown in FIG. 24 and consisting of a group of control address circuits numbered from 2410 through 2450 are utilized throughout the entire system for one or more remote stations. The circuitry is similar to that previously discussed in connection with the scan address encode circuits.

Coded addresses are developed by inclusion of the proper diodes from D1 through D9 as discussed previously. Selection of a particular address encode circuit is primarily in response to the presence of a priority recognition signal from the priority circuit and an address input signal from a point selection circuit such as 2510 which would be applied through inverter 2411 to gate 2412 in combination with appropriate clock pulses which will set latch 2415 to provide an output at inverter 2416. After latch 2415 has been set this output signal will be applied to the common activate signal 2490 which is shared by all the control address encode circuits over the lead designated LA and through inverter 2493 to gate 2494. When this signal is provided along with the enabled signal from the priority circuit the activate address will be generated as determined by the strapping of diodes D1 to D9.

Returning to the Control Address Load circuit 2210 the outputs of the control address load circuit are connected to terminal block 2240 as are address outputs of the scan address encode circuits of the FIG. 20 and the control address encode circuits and common address activate circuit of FIG. 24. At this point they are strapped on a coded basis into the appropriate channel inputs of the parallel load circuit of FIG. 17. It should be noted that the modifier bits 1′ through 12′ are loaded into channel A when the address and command bits are loaded into channel C of the parallel load circuit.

POINT SELECTION CIRCUIT

Figure 25:
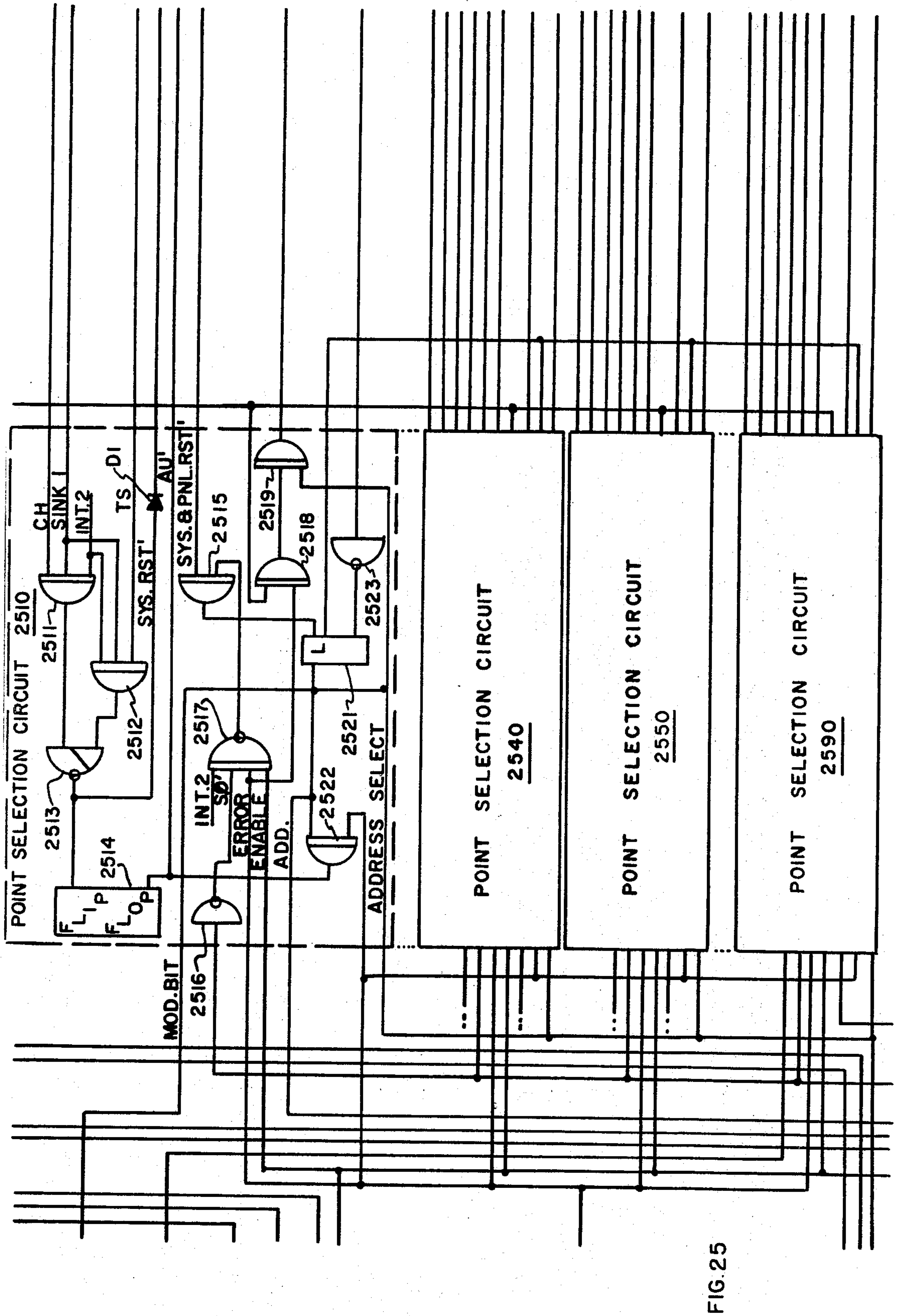

The Point Selection circuits of FIG. 25 are provided on the basis of one circuit for each device throughout the system to be controlled. As shown in FIG. 25 circuits 2510 through 2540 could be associated with a first remote station and circuits 2550 through 2590 would be associated with another remote station. The point selection circuits register the operataion of a selection push button such as 2718 in the panel equipment of FIG. 27 and provide indication of an authorized change or alarm to the point indication circuitry of FIG. 26.

When a device selection push button is operated, latch 2521 will be set by way of the signal applied through inverter 2523. The output of this latch will be extended over the appropriate modifier bit lead to the parallel load circuit of FIG. 17 and, also enable the appropriate control address encode circuit. It also will apply a signal through gate 2519 to the "white" select lamp of FIG. 27 to indicate that the device has been selected. If the control command thus derived after a command function key such as 2711, 2712 or 2713 of FIG. 27 is operated, unsuccessfully, an error signal will be returned and the lamp lead will be caused to rapidly go from zero to true state by virtue of the application of the square wave signal from flasher 2750, thus causing the white lamp 2717 to flash. This will occur after two attempts at control are made. The output of gate 2522 is derived from the setting of latch 2521 and the sequence complete satisfactory signal from the control address error circuit 2220.

POINT INDICATION CIRCUIT

FIG. 26 discloses the Point Indication circuits. One point indication circuit is provided for each point to be supervised throughout the system. As shown in FIG. 26 point indication circuits 2610 through 2640 represents points in a first remote station and point indication circuits 2650 through point indication circuit 2690 will represent a group of points supervised in another remote station. The principal purpose of the point indication circuit is to display the status of a device that has two conditions. This status is dislayed by lamps such as lamps 2715 and 2716 included in the panel equipment 2710 of FIG. 27.

It is possible for the point indication circuit to respond the following form of changes in the devices being supervised: an authorized change or status report whose change is the result of a command sent from the master station; (in this case flashing of the supervisory lamps and any audible alarm are inhibited); and an unauthorized change or status report whose change spontaneously occurs (in this case the flashing of the supervisory lamps and the audible alarm are not inhibited). Under initial status conditions the supervisory lamp representing the normal status of the device is steady. The other lamp will be off as will be the audible alarm.

During the receipt of an authorized change the supervisory contacts associated with the point in question at the remote station will obviously change from one state to another causing transmission of an appropriate message indicating this change to the master station. However, since this change is the result of initiation of a control sequence at the master station the selection of a particular address would via its AU output apply an appropriate signal to the point indication circuit such as 2610 so that the alarm circuitry driven by gate 2632 and latch 2633 will not be operated. The incoming signal now received from the data highway will in coincidence with the data sink signal received from the section distributor cause operation of the unoperated lamp driver circuitry, and cause defeat of the operated driver circuitry. An indication of the change at the master station will be shown, for example extinguishing green light 2715 and lighting red light 2716 in the panel equipment of FIG. 27 or vice versa.

Assuming that the change at the remote station was not authorized the signal from point selection equipment will not be present at the input of the point indicating circuit 2610 and as a result output signals will be developed by latch 2633 and AND gate 2632 causing both audible and visual alarms to sound in response to receipt of incoming change. When the change was unauthorized the output from the flasher 2750 of FIG. 27 will also be coupled with the lamp that has been lighted causing it to flash to further indicate the unauthorized character of the change.

OPERATOR'S EQUIPMENT

For use by an operator in connection with the supervision and control of the various points within the present system, certain lamp and key equipment is conventionally supplied on a control console, panel or rack. This equipment referred to includes equipment such as panel equipment 2710 or 2720 supplied on a one per remote station basis. Included in panel equipment such as 2710 are the common "on," "off" and "reset" push buttons such as 2711, 2712 and 2713, used to generate the appropriate command signals in connection with a particular remote station. Also included in each panel equipment such as 2710 for each remote station are the individual selection push keys and associated lamps to indicate selection of "on" and "off" status of a particular device to be controlled and supervised at a remote station. A group of these equipments will be associated with each remote station and may include a green "on" lamp 2715, a red "off" lamp 2616, a white "select" lamp 2717 and a selection push button 2718. Not shown but also appropriate for usage at each station would be additional red and green "on" and "off" lamps associated with individual points being supervised at each station but not associated with control devices. Their connection to point indicating circuits such as 2610, etc. of FIG. 26 would be similar to those connections utilized for lamps 2715 and 2716.

Manual interrogation keys such as the group 2731 through 2732 are supplied for all supervisory points throughout the system. Operation of one of these keys will cause a manual interrogation of the associated scan address point selected. It may be noted each key includes an individual connection to the associated scan address encode circuit such as the connection from key 2731 to scan address encode circuit 2010 and a common circuit from all of the manual interrogation keys to the manual interrogation control circuit 1840 of FIG. 18. Operation of any of these keys will cause operation of the manual interrogate control circuit and the associated scan address encode circuit in the manner previously described.

An error lamp such as 2741 and 2742 is provided for each office. These lamps are lit in response to the presence of communication errors as determined by the section distributor circuitry of FIG. 21. Also included adjacent to the operator's control equipment previously described would be an audible alarm device with associated reset circuitry, a visual alarm device with associated reset circuitry and a flasher utilized to control outputs from certain other circuits throughout the system, as described previously.

What is claimed is:

1. In a supervisory and control system, a master station, and a remote station, a communication link connecting said master station and said remote station, a plurality of equipment controllers and a plurality of equipment monitors at said remote station, said master station including: a data set connected to said communication link; a shift register connected to said data set; a priority circuit; and scan address means including circuit connections to said priority circuit and to said shift register, automatically operated in response to said priority circuit to transmit coded digital signals representative of an address associated with said plurality of equipment monitors, to said shift register; said shift register operated in response to said signals to control said data set to transmit said address over said communication link to said remote station for operation of said equipment monitors; said data set further operated in response to receipt of signals representative of the status of each of said equipment monitors to transmit said signals to said shift register; point indication means including circuit connections to said shift register; data registration means; and information distribution means including circuit connections to said scan address means, to said data registration means, and to said point indication means; said information distribution means operated in response to said scan address means to condition said data registration means; said data registration means comprising a data storage buffer connected to said shift register operated in response to conditioning by said information distributor and receipt of signals from said shift register to store said signals; and said data registration means further comprising data logging means connected to said buffer operated in response to signals stored in said buffer to register said signals; said information distribution means further operated in response to said scan address mean to condition said point indication means; said point indication means operated in response to said conditioning and said status signals to visually indicate said status signals.

2. A supervisory and control system as claimed in claim 1, wherein said master station further includes control address means connected to said shift register and to said priority means; point selection means connected to said control address means, manually operated to select one of said equipment controllers at said remote station; said control address means operated in response to said selection to request enablement by said priority circuit; and further operated in response to said enablement to transmit coded signals representative of said selected equipment controller digital address, and a modifier bit signal representative of a specific controller to said shift register; said point selection means further manually operated to operate said control address means to transmit an operating mode signal to said shift register; said shift register operated in response to receipt of said signals, to control said data set to transmit said selected controller address, said modifier bit signal, and said mode signal to said remote station.

3. A supervisory and control system as claimed in claim 2, wherein: said point selection means further include visual indicating means operated in response to the selection of one of said equipment controllers to indicate said selection.

4. A supervisory and control system as claimed in claim 2, wherein said point selection means further include: a plurality of manually operated keys each selected to choose a different mode of operation for a selected one of said equipment controllers at said remote station.

5. A supervisory and control system including a master station and a remote station, a communication link connecting said master station and said remote station, means at said master station for transmitting an equipment monitor digital address, an equipment controller address, a modifier bit signal, and a mode signal, to said remote station over said communication link, and means for indicating and recording the status of equipment monitors at said master station, said remote station including: a plurality of equipment controllers; a plurality of equipment monitors; a shift register connected to each of said monitors; a data set connected between said communication link and said shift register, operated in response to receipt of an equipment monitor digital address to transmit said address to said shift register; address decoding means connected to said shift register operated in response to receipt by said shift register of said address signal to transmit an operating signal to a first one of said equipment monitors; said monitors each operated in response to said signal to said first monitor from said decoder, to sequentially transmit to said shift register digitally encoded data signals representative of the status of each of said monitors; said shift register further operated in response to said status signals to control said data set to transmit said signals to said master station for operation of said indication and said recording means said remote station further including, an address register connected to said address decoding means; a command register connected to said shift register; and a modifier register including circuit connections to said data set; said address decoding means operated in response to receipt by said shift register of a selected equipment controller address received by said data set over said communication link from said master station, to register said selected address in said address register; said modifier register operated in response to a modifier bit signal received by said data set to register said selected modifier bit signal; said command register operated in response to signals received from said shift register to register a selected mode signal; and a plurality of control means each including circuit connections to said address register to said modifier register and to one of said equipment controllers; a selected one of said control means operated in response to a selected address stored in said address register and a selected modifier bit signal stored in said modifier register, to extend a selected mode of operation signal to a selected one of said equipment controllers.

6. A supervisory and control system as claimed in claim 5, wherein said remote station further includes: timing range selection means including a plurality of circuit connections to said control means, register output enabling means connected to said range selection means, operated in response to said range selection means to operate said register output enabling means for a predetermined period of time.

References Cited

UNITED STATES PATENTS

| | | | |
|---|---|---|---|
| 3,336,577 | 8/1967 | Frielinghaus | 340—163 |
| 3,350,687 | 10/1967 | Gabrielson | 340—163 |
| 3,413,607 | 11/1968 | Fine | 340—163 |
| 2,452,590 | 11/1948 | McWhirter | 340—163 |
| 3,110,013 | 11/1963 | Breese | 340—163 |

HAROLD I. PITTS, Primary Examiner

U.S. Cl. X.R.

340—147, 151, 168